United States Patent

[11] 3,577,126

[72] Inventors Robert J. Molnar
 New York, N.Y.;
 Walter Parfomak, Wallington, N.J.
[21] Appl. No. 758,946
[22] Filed Sept. 11, 1968
 Division of Ser. No. 535,745, Mar. 21, 1966,
 Pat. No. 3,440,637
[45] Patented May 4, 1971
[73] Assignee The Bendix Corporation

[54] PULSE RESPONSIVE CONTROL NETWORK
 31 Claims, 11 Drawing Figs.
[52] U.S. Cl. ................................................. 340/167,
 325/39
[51] Int. Cl. ..................................................... H04q 3/00
[50] Field of Search ........................................... 340/167;
 325/39; 179/15 (Sig), 15 (Async)

[56] References Cited
 UNITED STATES PATENTS
3,394,223 7/1968 DeWitt ...................... 179/15X(Async)

Primary Examiner—Ralph D. Blakeslee
Attorneys—Herbert L. Davis and Plante, Hartz, Smith and Thompson ABSTRACT: A pulse responsive control network including a first and second plurality of control devices sequentially operated by electrical signal pulses of one sense for effecting control functions, together with first and second means operable respectively in response to initial sequential operation of a last of said first and second plurality of control devices for providing clearing pulses of another sense to condition other of the respective first and second plurality of control devices for sequential reoperation to effect a multiplexing action, together with switching means effective upon completion of the reoperation of the other of said first plurality of control devices to condition the second plurality of control devices for sequential operation by the electrical signal pulses of said one sense; and other means to effect electrical signal pulses of said other sense to selectively terminate the operation of the first and second plurality of control devices, said last mentioned means including a time delay means to cause the signal pulses of said other sense to terminate the operation of said second plurality of control devices after termination of the operation of the first plurality of control devices has been effected.

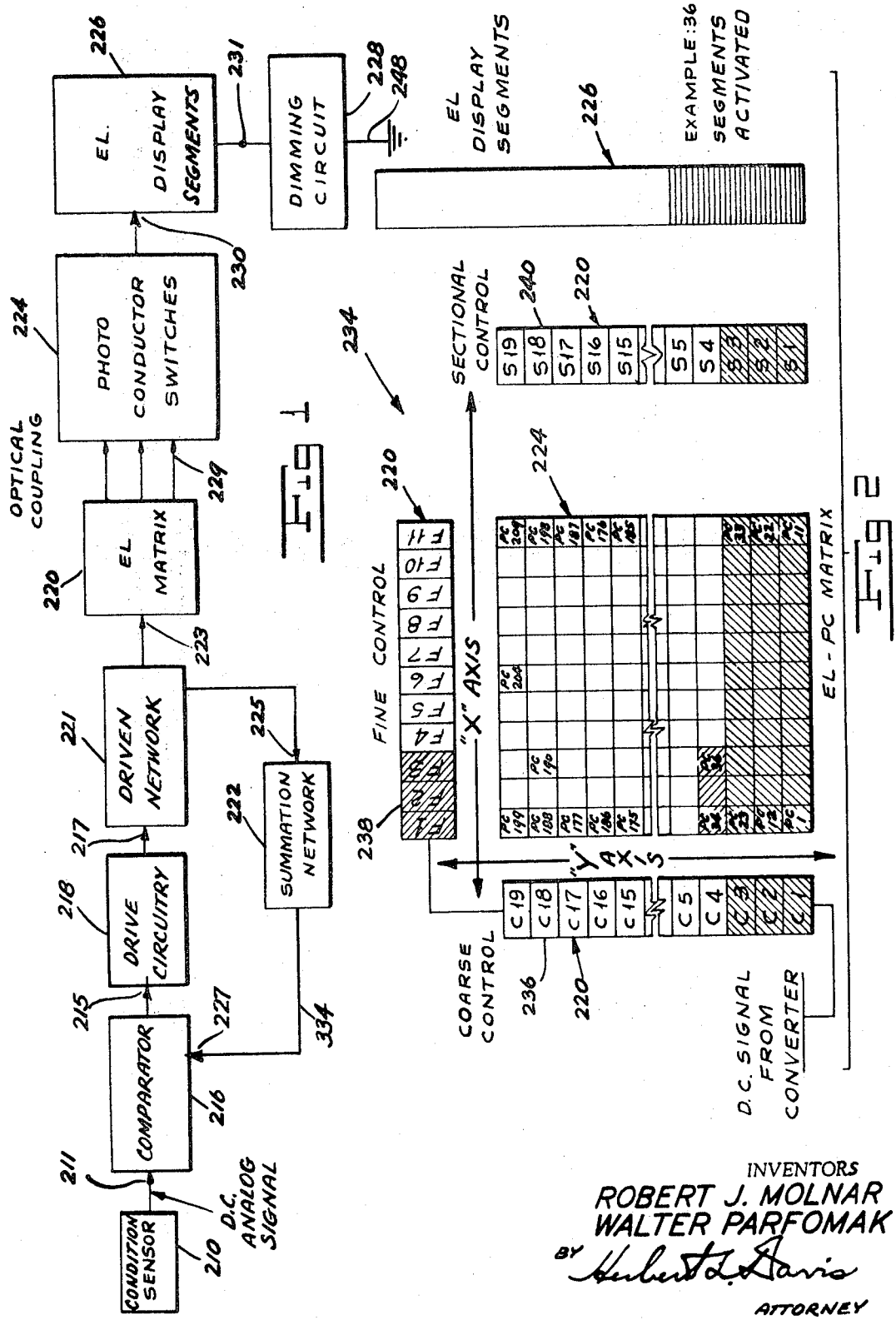

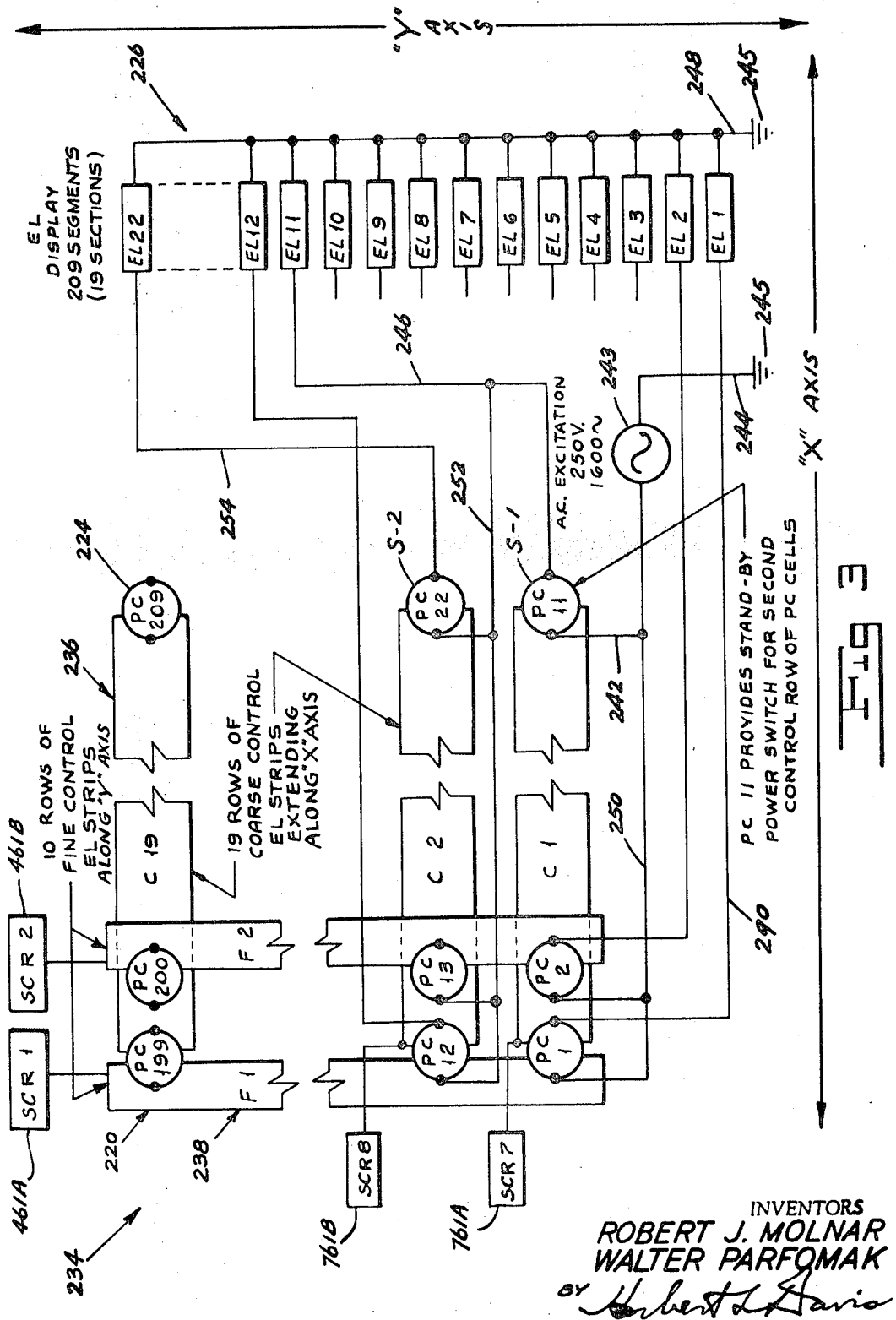

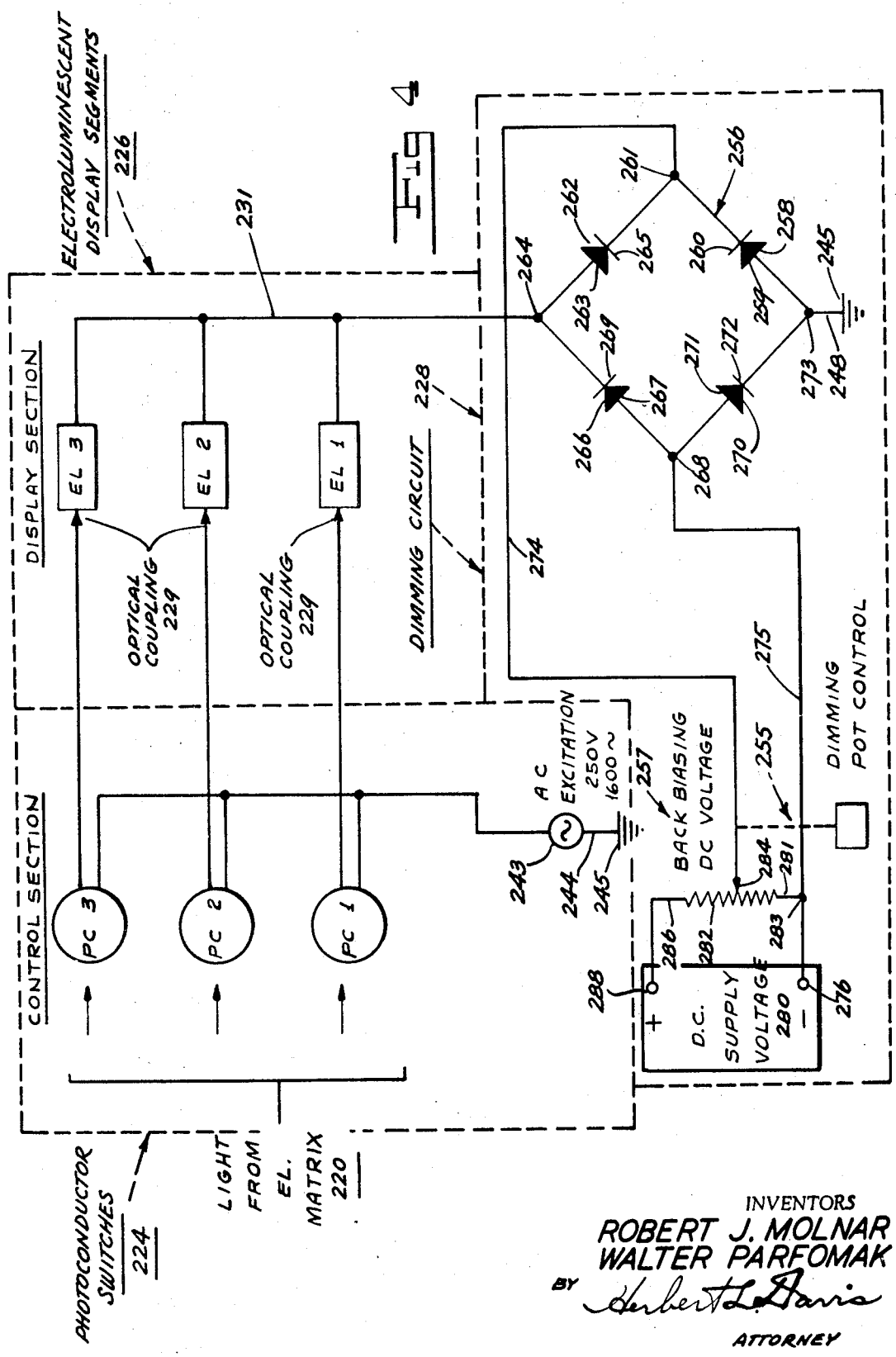

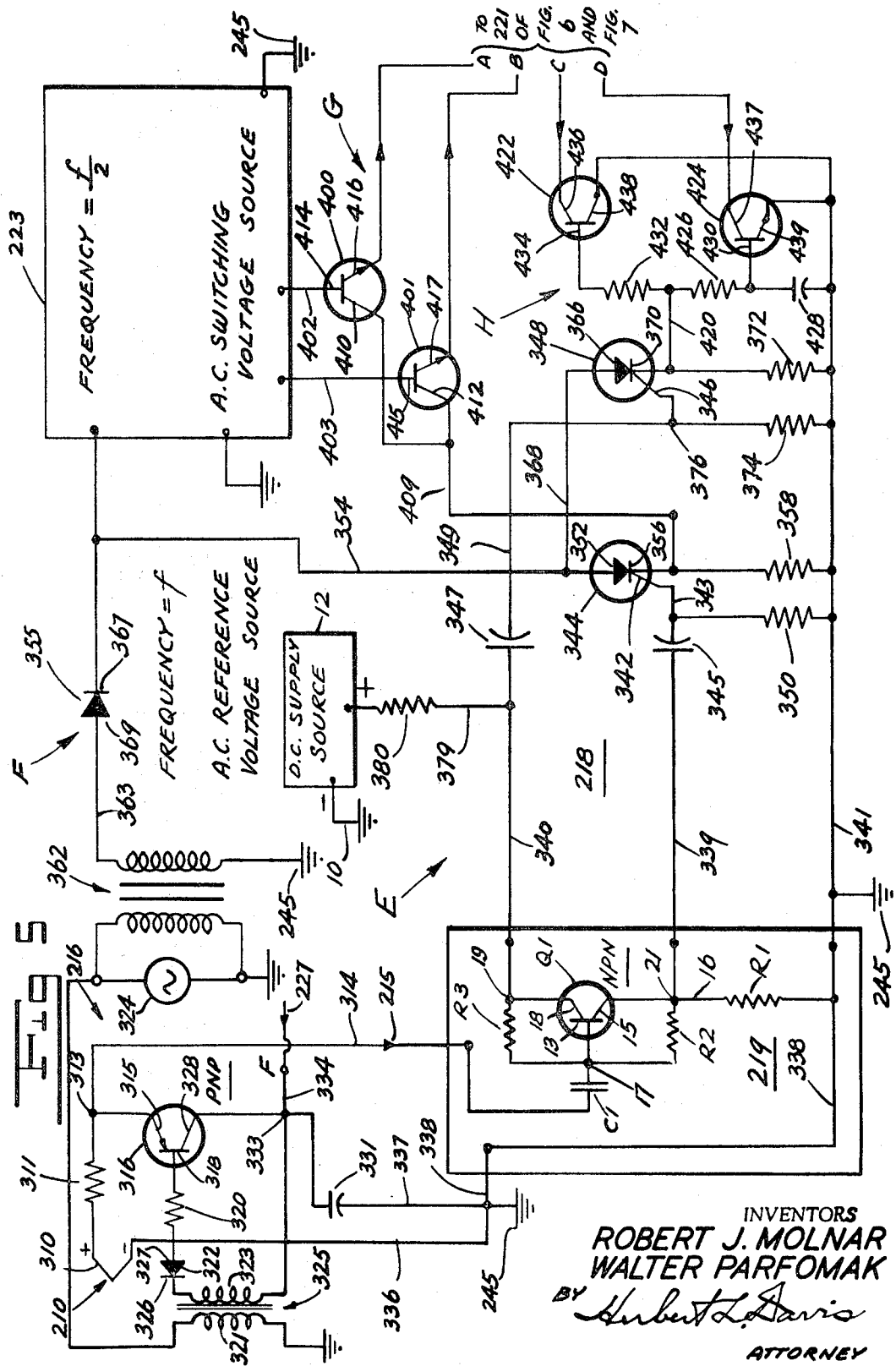

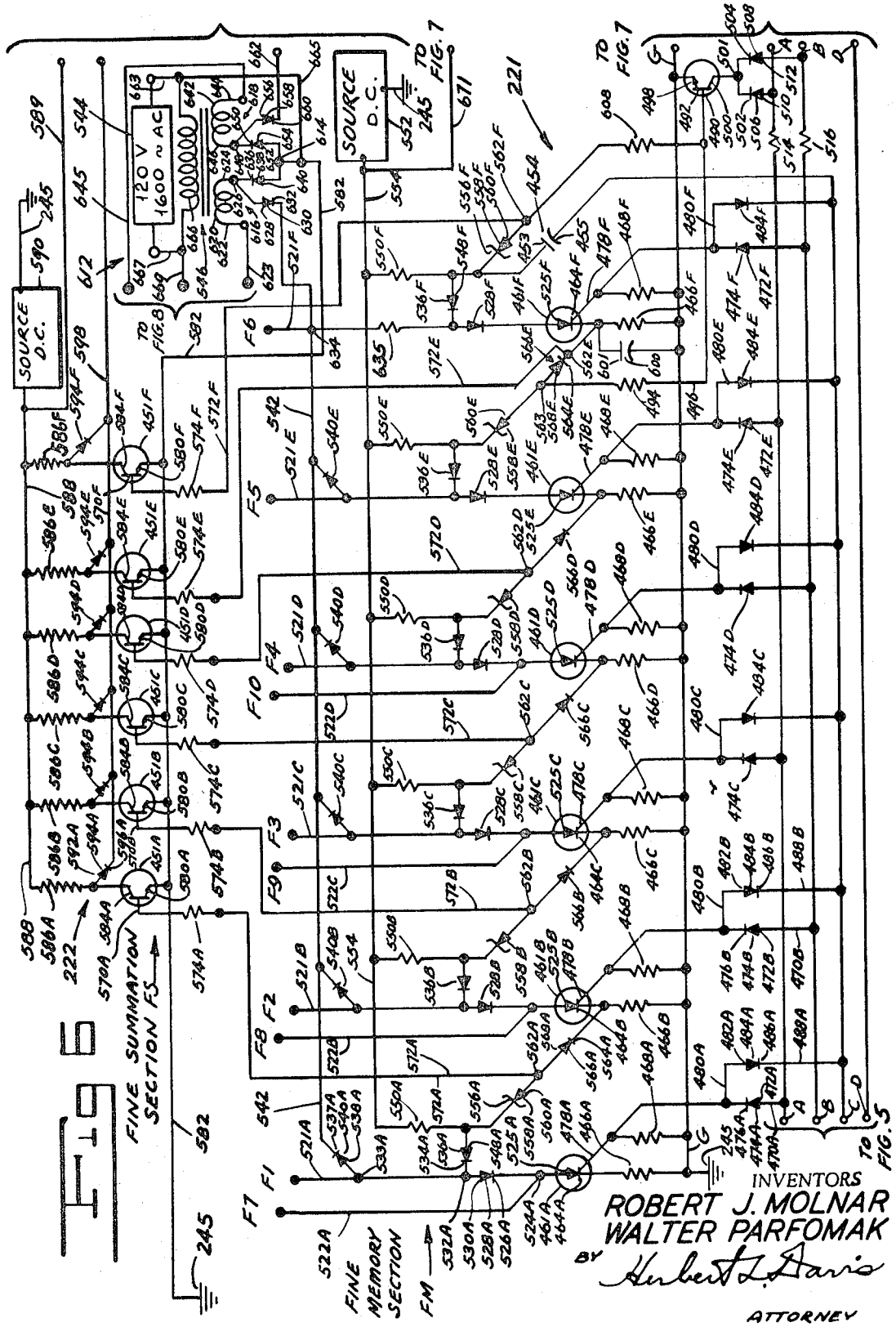

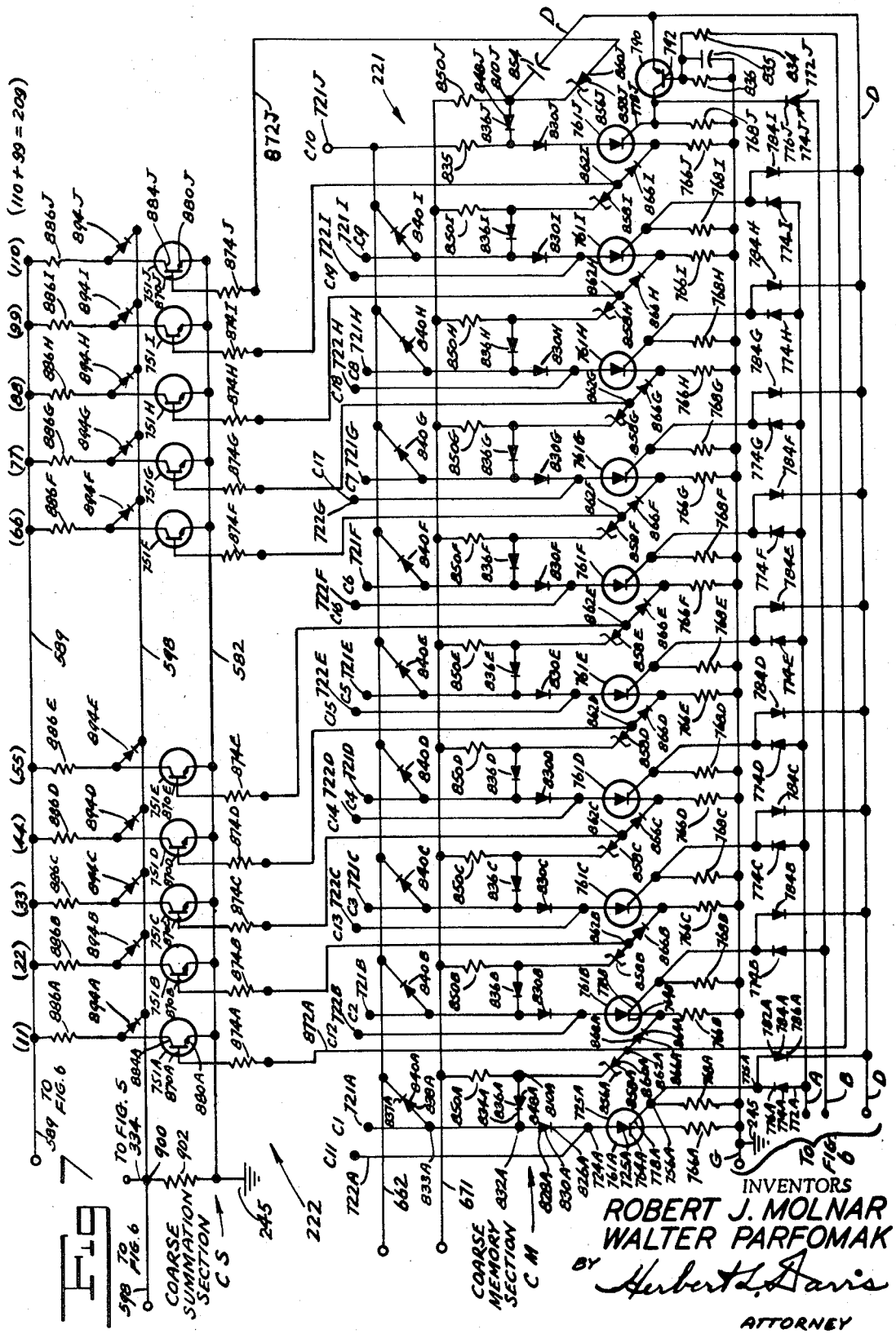

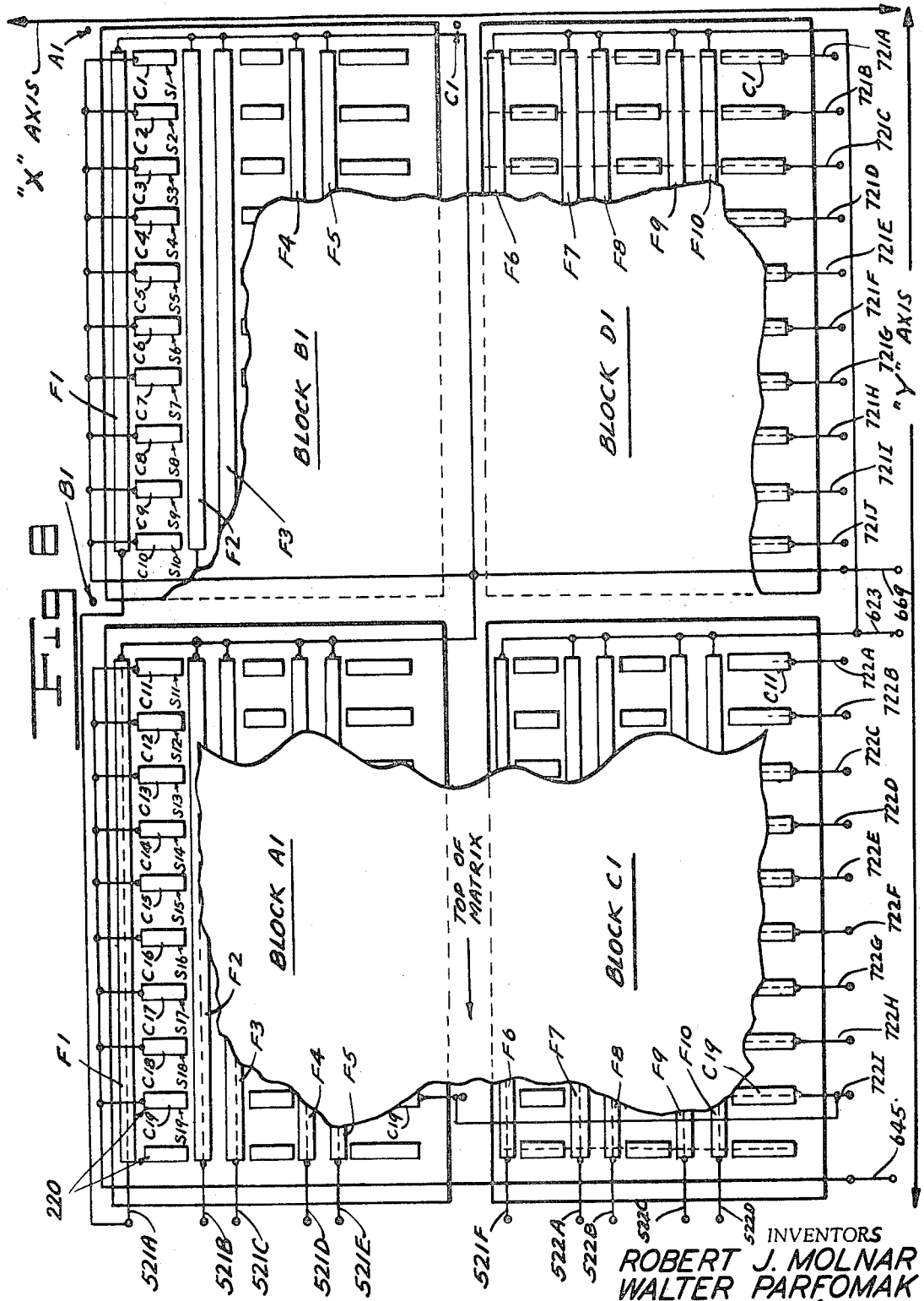

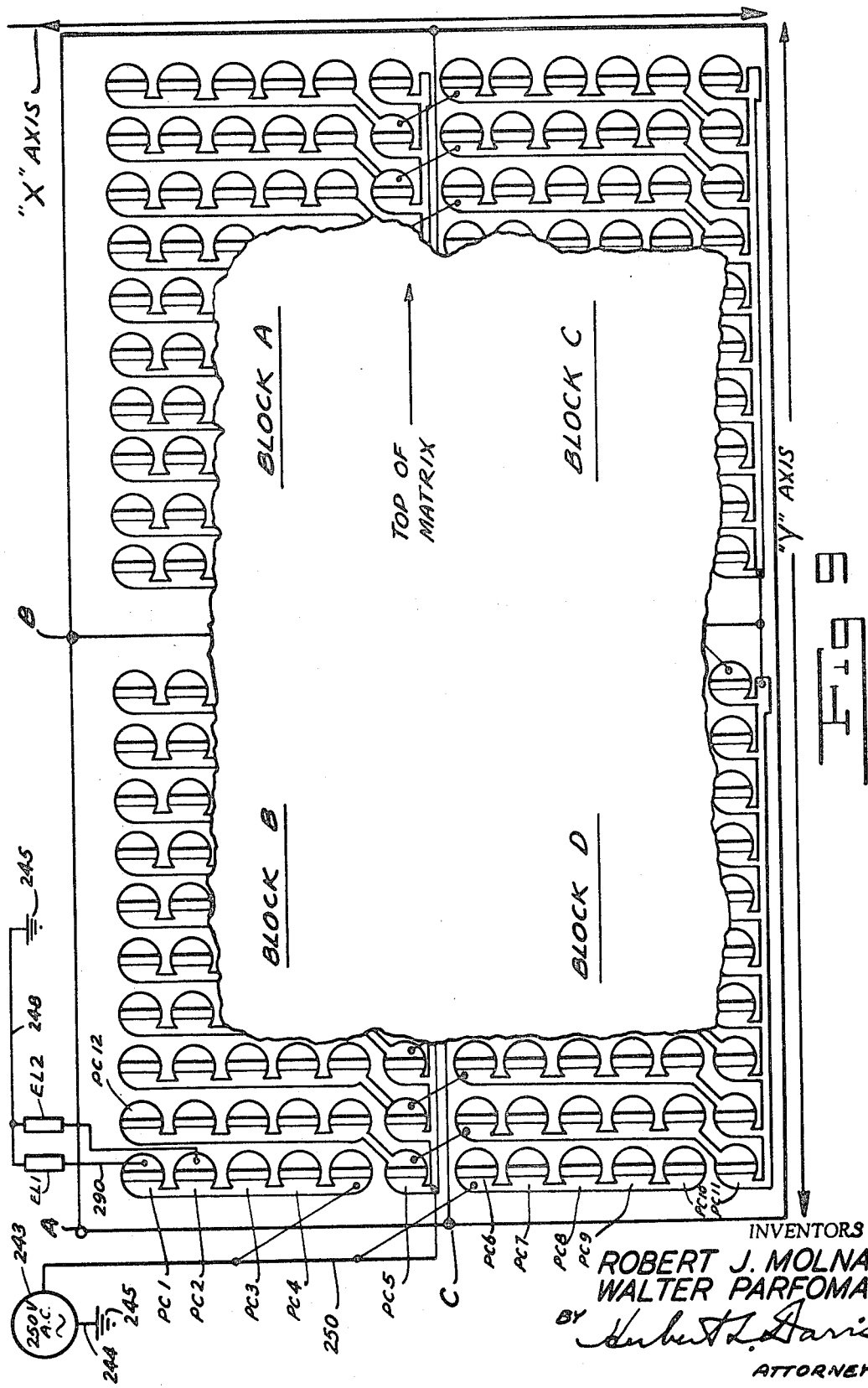

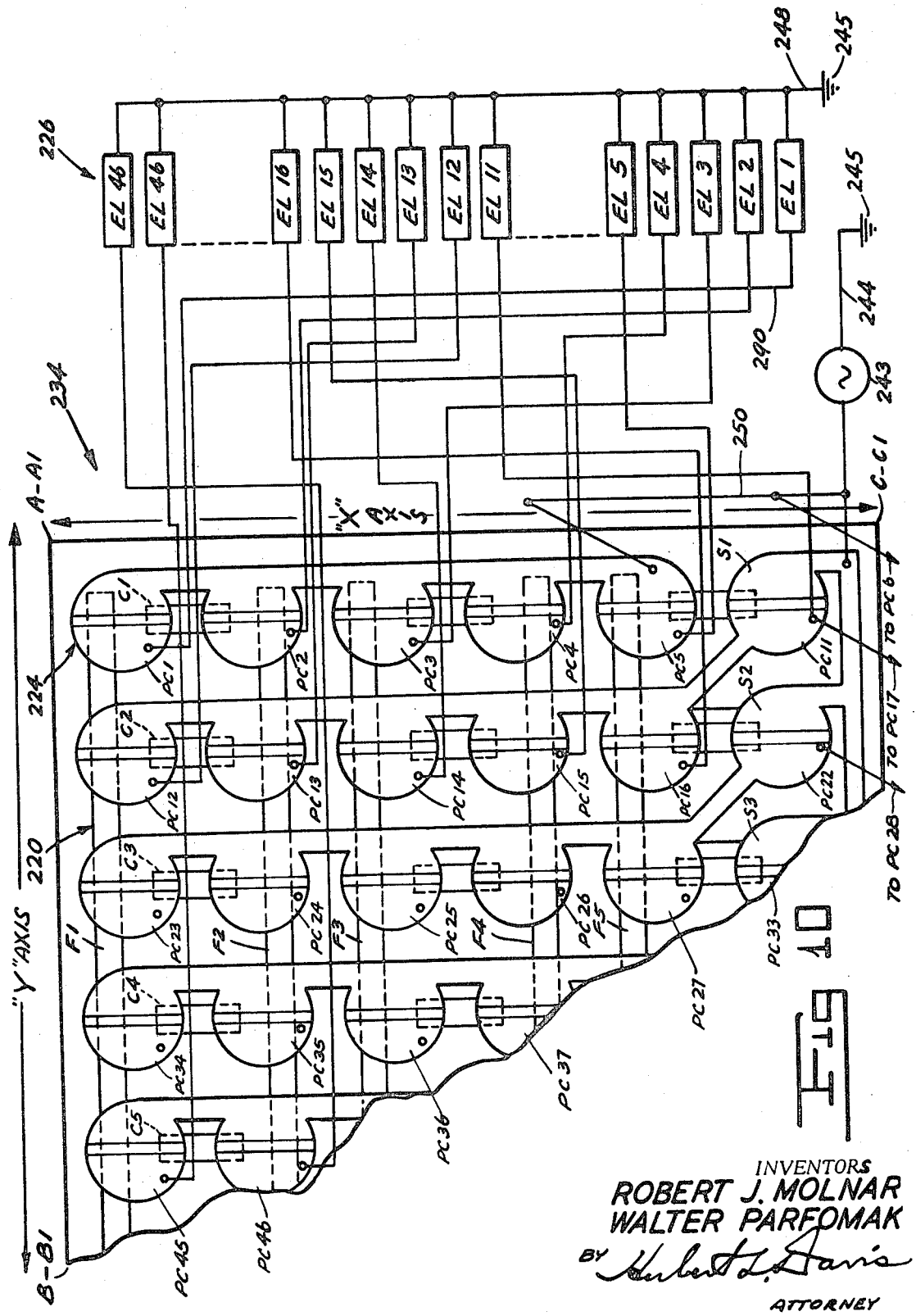

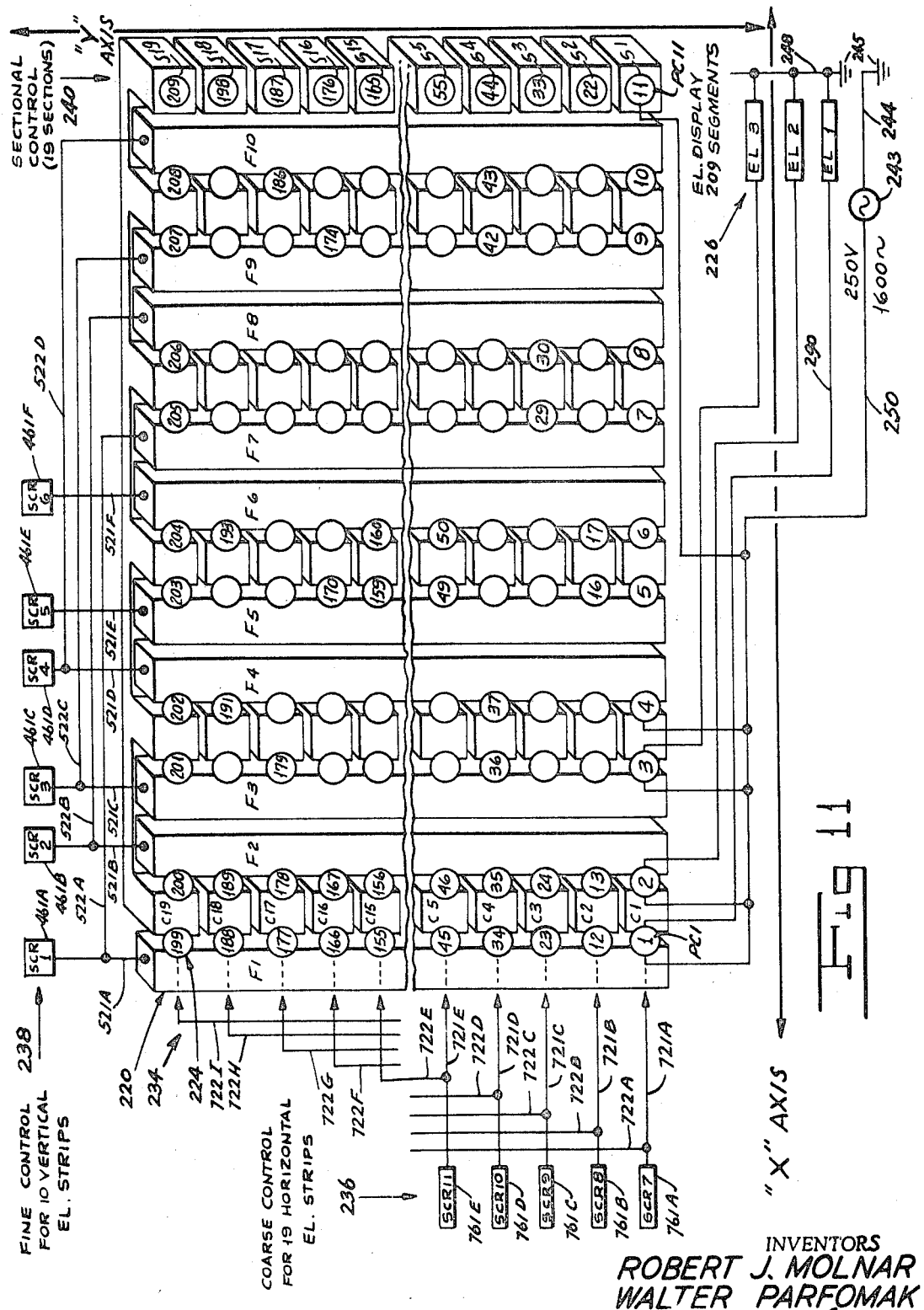

PULSE RESPONSIVE CONTROL NETWORK

CROSS-REFERENCE TO RELATED APPLICATIONS AND PATENTS

The present application is a division of a copending U.S. application Ser. No. 535,745, filed Mar. 21, 1966, by Robert J. Molnar and Walter Parfomak and now U.S. Pat. No. 3,440,637, granted Apr. 22, 1969 for a Solid-State Display with Electronic Drive Circuitry. The present invention is directed to a pulse responsive control network as described and claimed herein with reference to the control network of FIGS. 6 and 7. The dimming control network described herein with reference to FIG. 4 is the subject matter of a U.S. application Ser. No. 758,378 filed Sept. 9, 1968 by Robert J. Molnar and Walter Parfomak as another division of the U.S. application Ser. No. 535,745, filed Mar. 21, 1966, and now U.S. Pat. No. 3,440,637, granted Apr. 22, 1969. The last mentioned U.S. application Ser. No. 535,745 was in turn filed as a continuation-in-part as to all common subject matter of a now abandoned U.S. application Ser. No. 467,391, filed June 28, 1965, by Robert J. Molnar and Walter Parfomak for a Solid-State Display with Electronic Drive Circuitry.

The solid-state display system to which the pulse responsive control network of the present invention may be applied may include a condition sensor, comparator, drive circuitry, driven step integrator network and feedback summation network for driving a plurality of electroluminescent display segments. In such a display system the condition sensor may, for example, include: (1) a thermocouple of a type arranged to provide an analog direct current signal corresponding to a sensed temperature condition; or (2the condition sensor may be of a fuel flow synchro sensing type which may necessitate the use of a converter such as described and claimed in a U.S. Pat. No. 3,375,508, granted Mar. 26, 1968, on U.S. application Ser. No. 422,766, filed Dec. 31, 1964 by Robert J. Molnar and Walter Parfomak, the inventors of the present invention.

Further, the comparator provided in the system may be of a type described and claimed in a U.S. Pat. No. 3,363,112, granted Jan. 9, 1968, on a U.S. application Ser. No. 386,996, filed Aug. 3, 1964 by Robert J. Molnar and Walter Parfomak, the inventors of the present invention.

Moreover, the electronic drive circuitry utilized in the system may be of a type described and claimed in a U.S. Pat. No. 3,333,114, granted July 25, 1967, on a U.S. application Ser. No. 400,534, filed Sept. 30, 1964 by Robert J. Molnar and Walter Parfomak, the inventors of the present invention.

Furthermore, there may be provided in the drive circuitry a control circuit and electronic step integrator of a type described and claimed in a U.S. Pat. No. 3,427,609, granted Feb. 11, 1969, on a copending U.S. application Ser. No. 411,803, filed Nov. 17, 1964 by Robert J. Molnar and Walter Parfomak, the inventors of the present invention. All of the foregoing applications and patents have been assigned to The Bendix Corporation, the assignee of the present invention.

As distinguished from the foregoing features, the present invention is directed to an improved pulse responsive control network as more specifically described and claimed herein with reference to FIGS. 6 and 7.

BACKGROUND OF THE INVENTION

1. Field of the Invention

The invention is in the field of solid-state display with electronic drive circuitry and, more particularly, to an improved control network including improved electrical pulse responsive control means.

2. Description of the Prior Art

Heretofore, solid-state display systems have been provided including means for controlling the illumination of a stack of electroluminescent segments which may be of a type similar to that of the electroluminescent segments disclosed in a U.S. Reissue Pat. No. 26,207, granted May 23, 1967 to Frederick Blancke Sylvander and assigned to The Bendix Corporation, assignee of the present invention.

In the display system of the U.S. Reissue Pat. No. 26,207, and in the arrangement of the present invention, the electroluminescent segments are of a type having thin films of phosphor material sandwiched or positioned immediately between two electrical conductive layers one or both of which may be transparent. In such an arrangement, each electroluminescent layer is essentially a capacitor which is so arranged that upon the application of an alternating current voltage across the outer conductive layers, the phosphor material will emit light, as heretofore explained in the aforenoted U.S. Reissue Pat. No. 26,207, while upon a direct current voltage being applied thereto, the capacitor effect of the electroluminescent segment serves to block the passage of the direct current therethrough so that no light is emitted from such electroluminescent segment.

In the present invention, the specific control network for the stack of electroluminescent display segments is quite different from that disclosed in the U.S. Reissue Pat. No. 26,207. Thus in addition to the provision of a means responsive to an output signal proportional to a sensed condition to selectively operate a control network so as to connect a source of alternating current to said display segments for effectively illuminating said segments to provide a variable length luminous display column indicative of the sensed condition, there is further provided in this invention an improved electrical pulse responsive control network for effecting the selective control functions in four modes of operation corresponding to (1) a large increasing signal condition, (2) a small increasing signal condition, (3) a small decreasing signal condition, and (4) a large decreasing signal condition.

Such modes of operation result from the provision of a plurality of first control devices sequentially operated in response to small increasing and decreasing signal conditions and a plurality of second control devices sequentially operated in response to large increasing and decreasing signal conditions; together with control means selectively operated in response to an operative condition of the last control device of each of the first and second plurality of control devices for providing a multiplexing action of the other control devices of said first and second plurality of control devices.

There is no suggestion in the prior art of the foregoing idea of means and the mode operation thereof as provided in the present invention.

SUMMARY OF THE INVENTION

The invention contemplates an improved electrical pulse responsive control network applicable in response to a sensed condition control to effect illumination of a stack of electroluminescent segments in four modes of operation corresponding to (1) a large increasing signal condition, (2) a small increasing signal condition, (3) a small decreasing signal condition, and (4) a large decreasing signal condition.

An object of the present invention is to provide an improved pulse responsive control network to effect the foregoing including a first plurality of control devices or rectifiers sequentially operated by electrical signal pulses of one sense for effecting the desired control functions, together with a control means or Zener diode operative in response to an initial sequential operation of a last of said first control devices for causing the operation of a capacitor in such a manner as to effect an electrical clearing pulse of another sense to terminate the operation of the other of said first control devices or rectifiers.

Another object of the invention is to provide a circuit holding means rendered effective by the initial operation of the last of said first control devices or rectifiers for maintaining the control functions effected by the initial sequential operation of said other first control devices so that the first control devices may be reoperated to provide a desirable multiplexing action.

Another object of the invention is to provide in the aforenoted arrangement a capacitor-resistance network rendered effective by the initial operation of the last of said first control devices to provide a time delay action to prevent the aforesaid electrical clearing pulse of said other sense from terminating the initial operation of the last of said first control devices.

Another object of the invention is to provide in the aforenoted arrangement an improved switching means conditioned by the initial operation of the last of said first control devices for subsequent operation upon completion of a sequential reoperation of the other of said first control devices to render effective a second plurality of control devices, the second plurality of control devices being thereupon sequentially operable by electrical signal pulses of said one sense for effecting other control functions.

Another object of the invention is to provide in the aforenoted arrangement another current control means or Zener diode operative in response to an initial sequential operation of a last of said second control devices for causing the operation of another capacitor in such a manner as to effect an electrical clearing pulse of said other sense to terminate the operation of the other of said second control devices.

Another object of the invention is to provide other circuit holding means rendered effective by the initial operation of the last of said second control devices for maintaining the control functions effected by the initial sequential operation of the other of said second control devices so as to permit reoperation of the other of said second control devices to provide a desirable multiplexing function.

Another object of the invention is to provide in the aforenoted arrangement switching means controlled by the operation of the first of said sequentially operable second control devices for rendering the last mentioned electrical clearing pulse ineffective to terminate the operation of the last of the second control devices.

Another object of the invention is to provide in the aforenoted arrangement means whereby the operation of the last of said second control devices may be terminable by subsequent clearing pulses being applied following termination of the operation of the first of said sequentially operable second control devices.

Another object of the invention is to provide means responsive to electrical signal pulses of another sense to effect electrical clearing pulses to selectively terminate the operation of the first and second plurality of control devices, and said last mentioned means including a time delay means to cause the clearing pulses to terminate the operation of said second plurality of control devices after the operation of the first plurality of control devices has been terminated by the clearing pulses provided by said means in response to the electrical signals of said other sense.

These and other objects and advantages of the invention are pointed out in the following description in terms of the embodiment thereof which is shown in the accompanying drawings.

IN THE DRAWINGS

FIG. 1 shows a block diagram of an electroluminescent photoconductor solid-state display system embodying the invention.

FIG. 2 is a symbolic representation of the electroluminescent photoconductor matrix in a novel layout arrangement for indicating coarse, fine, and sectional controls in driving the electroluminescent display segments.

FIG. 3 shows an enlarged detailed fragmentary schematic view of the electroluminescent photoconductor matrix shown in FIG. 2, as attached to the electroluminescent display segments for illuminating the same.

FIG. 4 is a detailed circuitry of the dimming circuit shown in FIG. 1.

FIG. 5 is an electronic circuit diagram of the comparator and drive circuitry for operating the driven network of the electroluminescent photoconductor solid-state display system shown in FIG. 1.

FIG. 6 shows the fine driven and feedback summation networks of the electronic circuit shown in FIG. 5.

FIG. 7 shows the coarse driven and feedback summation networks and a continuation of the networks shown in FIG. 6.

FIG. 8 shows the fine and coarse electroluminescent capacitor control section of the system.

FIG. 9 shows the photoconductor control section of the system.

FIG. 10 shows an enlarged detailed fragmentary schematic view of the photoconductor section of FIG. 9 overlaying the fine and coarse electroluminescent capacitor control section of FIG. 8; and, FIG. 11 is a layout of another embodiment of the solid-state display system showing a fine and coarse electroluminescent control section like FIG. 8 interconnected with a photoconductor control section like FIG. 9 to produce an electroluminescent photoconductor matrix which is operated by a silicon controlled rectifier switching arrangement like the arrangement shown in FIG. 5 to 7 for lighting the electroluminescent display segments.

DESCRIPTION OF THE INVENTION

The electroluminescent photoconductor solid-state display system comprises an indicator panel and a driven network utilizing a novel optoelectronic approach. A condition sensor device is provided to obtain from analog signals such as exhaust gas temperature, fuel flow or a tachometer, a direct current analog signal to control a comparator circuit and in turn an electronic drive circuitry to effect a corresponding control of a driven network including electroluminescent segments arranged in an instrument simulating a thermometer-type moving display.

More specifically the condition sensor means used may, for example, be: (1) a thermocouple of a type arranged to provide an analog direct current signal corresponding to a sensed temperature condition; or (2) the condition sensor means may be of a fuel flow synchro signal sensing type which may necessitate the use of a converter such as described in the aforementioned U.S. Pat. No. 3,375,508, granted Mar. 26, 1968 to Robert J. Molnar et al., assigned to The Bendix Corporation, the same assignee as the present invention; or (3) the condition sensor means may be tachometer signal sensing means of a type in which tachometer signals are converted to produce one pulse per cycle of a generator speed and in which the amplitude and width of the pulses are controlled so that a filtered output produces a direct current analog signal which is an accurate function of the sensed condition or tachometer speed.

Referring to the drawing of FIG. 1, there is indicated a block diagram of the system. A condition sensor 210 provides a direct current analog signal corresponding to the sensed condition which is directed, as shown by arrow 211, to an electronic error detector, such as, a comparator 216, which may be analogous to a differential in an electromechanical system. The comparator 216 may be of the type described and claimed in the aforenoted U.S. Pat. No. 3,363,112, granted Jan. 9, 1968 to Robert J. Molnar and Walter Parfomak for a single transistorized comparator circuit and assigned to The Bendix Corporation, the assignee of the present invention.

An electronic drive circuitry 218 which may be of a type described and claimed in the aforenoted U.S. Pat. No. 3,333,114, granted July 25, 1967 to Robert J. Molnar and Walter Parfomak for an electronic drive circuit and assigned to The Bendix Corporation, may include as shown by FIG. 5, a control circuit 219 which receives the differential output signal, as shown by arrow 215, from the comparator 216. The control circuit 219 in turn controls the operation of the drive circuit 218 in applying driving pulses, as shown by arrow 217 of FIG. 1, to a driven network 221.

The driven network 221, shown in FIGS. 6 and 7, under control of the driving pulses applies electrical pulses, as indicated by the arrow 223 of FIG. 1, to regulate the operation of the electroluminescent matrix 220, as shown by FIG. 8. Further, a summation network 222 receives electrical signal information, as shown by arrow 225, from the driven network 221 and directs a feedback signal, as indicated by the arrow 227, to the comparator 218 corresponding to the regulated condition of the matrix 220.

More specifically the driven network 221 directs signal information corresponding to the regulated operation of the electroluminescent capacitor strips extending, as shown by FIG. 8, along the X-axis and Y-axis of the matrix 220, while the summation network 222 then integrates the information signal until the direct current feedback signal voltage directed to the comparator 216 from the summation network 222, as shown by an arrow 227 of FIG. 1, is equal to the direct current analog signal voltage directed to the comparator 216 from the condition sensor 210, as shown by the arrow 221. That is, the DC feedback signal voltage acts in opposition to the DC analog signal voltage so that when the resulting differential or error signal voltage is reduced to zero, the integration is accomplished.

ELECTROLUMINESCENT MATRIX

It should be also noted at this time that multisegment switching of the electroluminescent display portion of the invention requires three orders of control including a fine control, a coarse control, and a third order of control achieved by photoconductor switches 224 being arranged to receive light from the electroluminescent capacitor strips F1 to F10 of the electroluminescent matrix 220, as shown by arrows 229 of FIG. 1.

A last row of Y-axis extending photocells are provided to control the excitation of each succeeding row of X-axis extending photocells in which the first row of X-axis extending photocells does not require such control since it is excited continuously.

The electroluminescent matrix 220 of FIG. 1 is shown symbolically in FIG. 2, partially in schematic form in FIG. 3 and in detail in FIGS. 8, 10, and 11.

In addition, the photoconductor switches 224, shown in the block diagram of FIG. 1, are also shown symbolically in FIG. 2, partially in FIGS. 3 and 4, and in detail in FIGS. 9, 10, and 11.

An electroluminescent display column made up of a series of electroluminescent display segments 226, shown in FIG. 1, is connected to be energized by the electroluminescent matrix 220 and the photoconductor switches 224, as shown by arrows 229 and 230, respectively. The electroluminescent display segments 226 are shown symbolically in FIG. 2 and partially schematically in FIGS. 3, 4, 9, 10, and 11. The electroluminescent display segments 226 are described more fully in the aforementioned U.S. Reissue Pat. No. 26,207.

A dimming circuit 228, providing means for dimming the electroluminescent display 226 by manual control, is shown in FIG. 1 connected to the system by a line 231. The dimming circuit 228 is more specifically shown in FIG. 4, as including a back biased diode bridge in series with the ground leg of the electroluminescent display section, as hereinafter more fully described.

As shown symbolically in FIG. 2 and in detail in FIGS. 8, 9, 10, and 11, the electroluminescent matrix 220 is optically coupled to the photoconductor switches 224 to form an electroluminescent photoconductor matrix 234. The electroluminescent photoconductor matrix 234 may, for example, comprise 209 photoconductor switches indicated by numerals PC1 to PC209, a coarse electroluminescent control 236 including 19 electroluminescent capacitor strips C1 to C19, extending along the X-axis, a fine electroluminescent control 238 including 10 electroluminescent capacitor strips F1 to F10, extending along the Y-axis with a symbolic F11 to show the last fine control, and a sectional control 240 which includes 19 sectional photoconductor switches S1 to S19, which are rendered conductive upon illumination of the associated coarse control electroluminescent capacitor strips C1 to C19.

The electroluminescent photoconductor matrix 234 symbolically shows, in FIG. 2, 209 squares representing the 209 photoconductor switches providing driving or switching means for the 209 electroluminescent display segments 226 numbered EL1 to EL209. It should be noted that each photoconductor switch PC1 to PC209 drives its correspondingly numbered electroluminescent segment, and in this sense are correlated one to the other. It should be also noted that FIG. 2 symbolically shows at 226 an example of 36 activated electroluminescent segments which are driven by 36 photoconductor switches PC1 to PC36.

The interconnection of the photoconductor switches 224 with their corresponding electroluminescent display segments 226 is shown in more detail in FIG. 3 wherein the electroluminescent segments 226 are controlled by the photoconductor switches 224 through the fine electroluminescent switching means 238 controlled by the six silicon controlled rectifier switches 461A to 461F of FIG. 6 which control the energization of the 10 electroluminescent strips F1 to F10. In addition, the coarse switching means 236 is controlled by the 10 silicon controlled rectifier switches 761A to 761J of FIG. 7 which control the energization of the 19 electroluminescent strips C1 to C19 of FIG. 8.

Therefore, as shown in FIG. 3, the electroluminescent photoconductor matrix 234 illuminates 209 photoconductor switches PC1 to PC209 through the electroluminescent strips F1 to F10 and C1 to C19 of FIG. 8, by the silicon controlled rectifier switches 461A to 461F and 761A to 761J which are operatively controlled by the driven network 221 of FIGS. 6 and 7.

It should be noted that FIG. 3 is a fragmentary drawing of the electronic circuitry to show the connection between the silicon controlled rectifier switches energizing the electroluminescent strips and that FIGS. 6 and 7 show in greater detail the silicon controlled rectifier electronic circuitry utilized in the solid-state display circuitry to drive the optoelectric portion of the system. That is, FIGS. 6 and 7 show the electronic circuitry which operates to energize the 19 electroluminescent coarse control strips C1 to C19 extending in the X-axis and the 19 electroluminescent fine control strips F1 to F10 extending in the Y-axis of the electroluminescent photoconductor matrix 234 to provide thereby two orders of control to illuminate the electroluminescent display segments 226. However, as hereinbefore described, and as shown in FIGS. 2 and 3, multisegment switching of the electroluminescent display 226 requires three orders of control. This third order of control is effected by providing photoconductor switches S1 to S19 of the sectional control 240 each of which sectional control switches corresponds to one of the photoconductors such as the last photoconductor in each row PC11, PC22, PC33, and so on up to the last photoconductor PC198 located on the next to the last row of photoconductors. These photoconductors, PC11, PC22, PC33, and so on to PC198 corresponding to the sectional control switches S1 to S19, respectively, are the last photoconductors on each of the electroluminescent strips extending on the X-axis from C1 to C18 except for the last electroluminescent strip C19. The last photoconductor PC209 may be utilized as an additional section control switch in the event more than 209 electroluminescent display segments were to be illuminated.

In this system the photoconductors S1 to S18 of the sectional control 240 are used to control the excitation for the next row of photoconductors extending on the X-axis. For example, as shown schematically in FIG. 3, the photoconductor PC11 corresponding to the sectional control switch S1 is used as a standby power switch for the second row of photoconductors, PC12 to PC22.

More specifically, as shown in FIG. 3, photoconductor PC11 corresponding to sectional control switch S1 is connected through line conductors 242 and 250 to one terminal of a suitable source of alternating current 243. The other terminal of the source 243 is connected by a line conductor 244 to a ground 245. The photoconductor PC11 is also connected by a line conductor 246 to electroluminescent segment EL11 and in turn the electroluminescent EL11 is connected to ground 245 by a common line conductor 248. In addition, the line conductor 250 connects the row of photoconductors PC1 to PC11. When the electroluminescent strip C1 is illuminated, light rays are directed thereby upon the photoconductors PC1 to PC11 to reduce their electrical resistance and render them conductive of electrical energy, whereupon voltage from the alternating current source 243 will be applied through photoconductor PC11 corresponding to the sectional control switch S1 to the photoconductors PC12 to PC22 through a line conductor 252. Thereafter, should the fine control electroluminescent strips F1 to F10 be illuminated, then the photoconductors PC11 to PC21 would be rendered conductive; or, should the coarse control electroluminescent strip C2 be illuminated, then the photoconductors PC11 to PC22 would become electrically conductive and current would be directed to the electroluminescent segments EL12 to EL22 for illuminating segments of the electroluminescent display 226. That is, when the photoconductor PC11 is switched on to illuminate the eleventh electroluminescent segment EL11 through the line conductor 246, it is also effective as the sectional control switch S1 to connect through the line conductor 252 for standby the next row of X-axis extending photoconductors PC12 to PC22.

Furthermore, the photoconductor PC22 is connected to the alternating current source 243 through photoconductor PC11 by the line conductor 252 and should the photoconductor PC22 have been previously rendered conductive by the illumination of the coarse control strip C2, the photoconductor PC22 then serves to effect the illumination of the electroluminescent segment EL22 through a line conductor 254. At the same time photoconductor PC22 is also effective as sectional control switch S2 to connect for standby the next succeeding row of X-axis extending photoconductors PC23 to PC33, as shown by FIG. 11. The photoconductor PC33, upon illumination of the coarse control strip C3, is rendered conductive to illuminate the electroluminescent segment EL33 and is thereupon effective as sectional control switch S3 to connect for standby the next succeeding row of X-axis extending photoconductors PC34 to PC44, and so on until photoconductor PC198, shown by FIG. 2, becomes effective upon illumination of the coarse control strip C18 to connect for standby the last row of X-axis extending photoconductors PC199 to PC209.

The driven network 221 while utilizing only 16 silicon controlled rectifier switches may be rendered effective to drive 10 Y-axis extending fine control electroluminescent strips and 19 X-axis extending coarse control electroluminescent strips, for energizing 209 electroluminescent display segments, as hereinafter explained with reference to FIGS. 6 and 7.

As shown schematically in FIG. 3, the electroluminescent display segments 226 are divided into a column of a number of small segments of a phosphor material. The number needed being determined by the accuracy, resolution, and sensitivity requirements of the display instrument.

DIMMING CONTROL

Referring now to the dimming control 228, a dimming potentiometer control 255 shown in FIG. 4 provides for manual control of the brightness of the energized electroluminescent display segments 226 so that the display may be distinguishable under any condition of ambient illumination.

The dimming circuit 228, shown in FIG. 4, comprises a back biasing diode bridge rectifier 256 connected in the common conductor 231 leading from the display segments 226, shown in FIG. 3, and interposed between the electroluminescent display segments 226 and the conductor 248 leading to ground 245. A dimming potentiometer control 255 is provided for the area source lamp to balance the display for darkness operation. The brightness of the electroluminescent segments will be adequate for visibility in normal lighting (approximately 50 foot candles). The arrangement is such that the diode bridge rectifier 256 serves to limit the passage of alternating current from the source 243 and through the display segments 226 to a voltage greater than a back biasing direct current voltage 257 set by adjustment of the potentiometer 255. In this manner, there is provided a precise control of the electroluminescent display brightness regardless of the number of electroluminescent segments activated.

Referring particularly to the back biasing diode bridge rectifier 256, it will be seen that a first diode 258 comprises an anode 259 connected to a junction 273 and thereby to the ground 245 by conductor 248 and a cathode 260 connected to a junction 261 to which leads the conductor 274 from the control potentiometer 255. A second diode 262 comprises an anode 263 connected to a junction 264 to which leads the line conductor 231 from the electroluminescent display segments 226 and a cathode 265 connected to the junction 261.

In addition, the bridge rectifier 256 comprises a third diode 266 having an anode 267 connected to a junction 268 from which leads the conductor 275 to the control potentiometer 255 and a cathode 269 connected to the junction 264 to which leads the line conductor 231 from the electroluminescent display segments 226. A fourth diode 270 has an anode 271 connected to the junction 268 and a cathode 272 connected to the junction 273 and thereby through the common line conductor 248 to the ground 245.

In this manner, the back biasing diode bridge 256 is connected to the ground 245 in series with the electroluminescent display segments 226 by its two junctions 264 and 273. The bridge rectifier 256 is also connected to the back biasing direct current voltage 257 at its junctions 261 and 268 through line conductors 274 and 275, respectively. The line conductor 275 is connected to a negative terminal 276 of a direct current supply voltage 280 and to one terminal 281 of a resistor 282 at junction 283. The other line conductor 274 is connected through a movable contact arm 284 to the resistor 282 which resistor is connected at an opposite terminal 286 to a positive terminal 288 of the supply voltage 280. The lighting intensity may be adjusted, as desired, by suitable adjustment of the dimming potentiometer control 255 to set the back biasing DC voltage so as to limit the effective voltage of the energizing alternating current applied through the bridge rectifier 256 to the electroluminescent display segments 226.

The electroluminescent display segments EL1 to EL209 are essentially capacitors and if a direct current voltage is applied across an electroluminescent segment no light would be produced. At the same time, if a portion of the alternate current voltage which is applied across the electroluminescent segment is blocked, it will vary its brightness. Therefore, since the electroluminescent segments 226 are in series with the bridge rectifier 256, an operator may adjust the control potentiometer 255 to vary the back biasing direct current, whereupon the alternating current supplied across the electroluminescent segments 226 will be varied to reduce or increase the brightness of the electroluminescent display lamps.

Control System For Display Segments

As herein described with reference to FIG. 1, a direct current analog signal voltage effected by the condition sensor 210 is compared in a comparator 216 with a feedback voltage applied through a summation network 222 by the driven network 221 and any difference or error voltage is fed to the electronic drive circuitry 218 of FIG. 5 to control the operation of a driven network 221 shown in FIGS. 6 and 7, as hereinafter more fully described.

Within the electronic circuitry of FIGS. 5 to 7, the differential error voltage resulting from the comparison of the direct current analog signal voltage and the feedback voltage is used to control the length of the lighted electroluminescent display column 226. That is, a lighted condition is caused to progress along the display column of the electroluminescent display segments 226 by the resulting operation of the driven network 221 which causes electroluminescent driving capacitor strips F1 to F10 and C1 to C19 to shine upon the photoconductor switches PC1 to PC209, as shown by FIG. 11, to excite, in turn, a predetermined number of the 209 electroluminescent display segments EL1 to EL209 corresponding to an indicated value of the condition sensed by the sensor 210.

Thus, by means of the direct current analog and feedback signals from the electronic circuit, the length of this lighted electroluminescent column of the display segment 226 is continuously compared to the value of the direct current input parameter of the sensor 210. When the lighted column of the display segments 226 has progressed to the predetermined length indicative of the sensed condition, the switching circuit is operated to stop further movement or illumination of the column of the display segment 226.

As hereinbefore described with reference to FIGS. 2 and 3, the various electroluminescent capacitor control strips F1 to F10 and C1 to C19 of the electroluminescent photoconductor drive circuits, internal to the display indicator, are not made in the same geometrical format as the column of the display segments 226. The display segments 226 may be made, for example, of 44 electroluminescent display segments to the inch, but the electroluminescent capacitor control strips are provided with a series of 10 parallel spaced electroluminescent fine control strips F1 to F10 extending in a Y-axis direction, and the other with a series of 19 parallel spaced electroluminescent coarse control strips C1 to C19 extending perpendicular thereto in an X-axis direction. The electroluminescent strips are then connected to the electronic control circuitry, partly shown in schematic form in FIGS. 3 and 4, and more fully shown in FIGS. 5, 6, and 7.

The various electroluminescent and photoconductor elements may be arranged on four or more thin cards, as shown in FIGS. 8, 9, and 10. These cards may be stacked and interconnected in the same manner as if they were a single format, as shown in FIG. 11. In addition, in simplifying the production of these electroluminescent photoconductor elements, this method may be used for trouble shooting and thus allow for change of scale factor in the summation of signals from each card. Reliability theory assigns a great importance to the proper assembly of individual electroluminescent and photoconductor cells.

The electronic drive circuitry shown in FIG. 5 and driven network 221 and summation network 222 shown in FIGS. 6 and 7 performs the guiding control for the various coarse and fine electroluminescent strips shown in FIG. 8, the photoconductors shown in FIG. 9, and eventually the electroluminescent display segments 226 as best shown in FIGS. 3 and 10.

The optoelectric connection between the electroluminescent strips of FIG. 8 and the photoconductors of FIG. 9 are shown partially in FIG. 10. That is, for an understanding of the interconnection of the electronic system with the electroluminescent photoconductor system, attention is directed to FIG. 10, which shows portions of the electronic circuitry interconnected with portions of the electroluminescent photoconductor system. FIG. 10 shows a portion of FIG. 9 overlayed on a portion of FIG. 8 to produce a more realistic connection between the photoconductor network of FIG. 9 with that of FIG. 8. It should be also noted that the numbering of the electronic elements and the electroluminescent photoconductor elements are designated the same through all of the FIGS., so that one may be able to understand their overall interconnection.

FIG. 11 shows a schematic interconnection of the silicon controlled rectifiers with the electroluminescent photoconductor system.

In the operation of the system shown in FIGS. 1 to 4, assuming that 13 segments of the electroluminescent display segments 226 are to be activated by an input signal, the input signal will drive three silicon controlled rectifier switches; that is, the switch 761A of the coarse silicon controlled rectifier circuitry 221 of FIG. 7 and the switches 461A and 461B of the fine silicon controlled rectifier circuitry 221 of FIG. 6 to turn on a portion of the electroluminescent matrix 220 of FIG. 8. That is the coarse electroluminescent capacitor strip C1 and the fine electroluminescent capacitor strips F1 and F2 will be turned on by the silicon controlled rectifiers to in turn effect the illumination of the display segments 226 to indicate a measured parameter of 13.

The electroluminescent capacitor strip C1 will then, upon illumination, act to switch on PC1 through PC11 and to apply voltage to the first 11 electroluminescent segments EL1 to EL11. Since only one sectional control switch S1 corresponding to standby photoconductor switch PC11 is activated, only the second row of X-axis extending photoconductors PC12 to PC22 will be on standby.

Thereafter, the fine electroluminescent strips F1 and F2 will activate or turn on, by illumination, the switches PC12 and PC13, making a total of 13 switches activated. The other photoconductor switches PC14 to PC22 will have voltage applied to them by photoconductor switch PC11, but since the electroluminescent strips F3 to F10 will not be energized by the silicon controlled rectifiers, they will not be illuminated to switch on the photoconductor switches PC14 to PC22.

Briefly then, the coarse control electroluminescent strip C1 produces a holding operation while the standby power switch PC11 corresponding to the sectional control switch S1 permits the fine control electroluminescent strips F1 and F2 to be illuminated to produce the succeeding or vernier operation for illuminating the electroluminescent display segments EL12 and EL13 to present a total of 13 electroluminescent display segments.

The detail circuitry and the mode of operation thereof in effectively controlling the display indicator 226 will be explained hereinafter more fully under the heading Summary of Operation of Solid-State Display System.

Comparator

Referring now to the electronic circuitry shown in detail by FIG. 5, it will be seen that the sensor used for the comparator circuitry is a thermocouple 310 connected to a simple single transistor comparator circuit 216.

The single transistor comparator circuit 216 provides for the comparison of signal and feedback inputs before the conversion into an alternating current form. The alternating current phase does not enter into the comparator circuit and, since the current through the single transistor is proportional to the difference of the inputs, the power dissipation of the single transistor is minimized since the signal and feedback inputs of the comparing signals are of the same polarity. Both of the inputs and the outputs can be applied in respect to the same common and no transformer isolation is required.

FIG. 5 of the drawing shows the details of the electronic comparator circuitry 216 which may be a type described and claimed in the aforenoted U.S. Pat. No. 3,363,112. The thermocouple 310 serves herein as a condition sensor which provides the first variable source of potential or direct current voltage in relation to a sensed parameter. The first variable source of potential of the thermocouple 310 is connected in series with a resistor 311, which in turn is connected to a junction 313. At the junction 313, the first potential is compared with a feedback second potential indicated by arrow 227 and applied at a junction point 333 through a conductor 334 leading from the summation network 222 shown schematically in FIG. 1 and in circuit detail in FIGS. 6 and 7. At the junction 313 a line conductor 314 connects the resultant differential or error signal voltage applied at an emitter terminal 315 of a PNP type switching transistor 316 in the comparator 216 to an input preamplifier and phase discriminator 219 of the drive circuitry 218 which may be of the type described and claimed in the aforenoted copending U.S. application Ser. No. 400,534.

In the comparator 216 and connecting a base terminal 318 of the transistor 316 is a limiting resistor 320 and a rectifying diode 322. The limiting resistor 320 and rectifying diode 322 are interposed between the transistor 316 and an alternating current reference voltage source 324 which may apply to a primary winding 321 and thereby to a secondary winding 323 of a coupling transformer 325 an alternating current voltage.

As shown in FIG. 5, the diode 322 includes a cathode 326 connected to one terminal of secondary winding 323 of the transformer 325 and an anode 327 connected to the resistor 320. The diode 322 blocks positive voltage pulses from the coupling transformer 325 and permits negative voltage pulses to go through it to impinge on the base lead 318 of the PNP transistor 316. Therefore, the diode 322 is used to block the positive pulses of the reference voltage signal from the base 318 of the transistor 316 while permitting the negative pulses to be applied to the base 318 of the transistor 316 to render the transistor 316 alternately conductive and nonconductive and thus effective as a switching means. In addition, the transistor 316 is provided with a collector terminal 328 which is connected at junction 333 to an opposite terminal of the secondary winding 323 of the coupling transformer 325. A capacitor 331 having one plate connected to junction 333 and an opposite plate connected by a conductor 337 to ground serves to eliminate any noise due to alternating current pickup and bypass the alternating current pickup to ground so that direct current voltage only is effective at junction 333.

The direct current feedback voltage effective at the junction 333 is supplied through the line conductor 334 from the summation network circuitry 222 shown in FIGS. 6 and 7 which provides the second potential. The second feedback potential applied then at the junction 333 is effectively compared with the first analog signal potential applied at junction 313.

Thus, there is provided a comparator 216 in which the first source of potential of the thermocouple 310 at the junction 313 is a command signal voltage which is compared with the second source of potential from the summation circuitries of FIGS. 6 and 7 at the junction 333. The second source of potential is a proportional feedback signal voltage directed from summation network 222.

In addition, as shown in FIG. 5, the thermocouple 310, the capacitor 331, and the drive circuit 218 are connected to ground 245 by line conductors 336, 337, and 338, respectively.

In the operation of the comparator 216 shown in FIG. 5, the second potential or direct current feedback voltage signal is applied to the collector terminal 328 of the PNP transistor 316 and compared with the first potential or direct current analog voltage signal at the sensor 310 developed in the circuitry at the emitter terminal 315 of the PNP transistor 316. The transistor 316 senses the difference of these two direct current signals and then converts the difference into a pulsating output signal of one phase upon the first signal dominating and of an opposite phase upon the second signal dominating and of a frequency F corresponding to that of the alternating current reference source 324.

It should be noted that if there is no difference between the two direct current signals, the one from the thermocouple 210 and applied at junction 313 and the other from the summation network 222 of FIGS. 6 and 7 and applied at junction 333, there will be no output, and the comparator 216 will be in an effective null condition. At this point, the reference alternating current voltage source at 324 will continue to apply, through the diode 322, negative pulses to the base 318 of the transistor 316 for effectively rendering the PNP-type transistor more conductive and then upon the negative pulse passing less conductive in the manner of a switch closing and then opening its contacts, but it will produce no effective output at the conductor 314.

This switching action of the transistor 316, however, upon the positive direct current voltage applied by the condition sensor or thermocouple 210 at the junction 313 being increased at the junction 313 in relation to the positive direct current feedback voltage applied at the junction 333 by the summation network 222, is thereupon effective to cause a pulsating direct current signal voltage to be applied at the output conductor 314 having a negative going phase in timed relation with the negative pulse applied to the base 318 of the PNP-type transistor 316 rendering the same more conductive and a positive going phase upon the cessation of the negative pulse applied to the base 318, rendering the transistor less conductive.

Thus upon an increase in the temperature condition sensed by the thermocouple 310 effecting an increase in the positive direct current voltage applied at the junction 313, there will be effected at the output conductor 314 a pulsating direct current signal in phase with the reference voltage from the source 324.

Conversely, upon a decrease in the temperature condition sensed by the thermocouple 210 effecting a decrease in the positive direct current voltage applied at the junction 313 in relation to the positive direct current feedback voltage applied at the junction 333 by the summation network 222, there will be effected at the output conductor 314 a pulsating direct current signal opposite in phase to the reference voltage from the source 324.

The pulsating direct current signal derived from the comparator 216, and indicated by arrow 215 and of the one phase or the other, is directed through the line conductor 314 into the preamplifier and phase discriminator 219 at the input to the drive circuitry 218. The signal is then directed to the drive circuitry portion of FIG. 5, as hereinafter described, through output line conductors 339 and 340.

Preamplifier And Phase Discriminator

The preamplifier and phase discriminator 219, as described in the U.S. Pat. No. 3,333,114, includes an NPN-type transistor Q1 having a base 13 connected to the output conductor 314 from the signal source or comparator 216 through a coupling capacitor C1, while an emitter 15 of the transistor Q1 is connected through a conductor 16, a resistor R1, and a conductor 338 to the ground 245 and thereby to the opposite output conductor 336 from the comparator 216.

The emitter 15 of the transistor Q1 is further connected to a capacitor junction 17 through a resistor R2, while the collector 18 is connected to the capacitor junction 17 through a resistor R3 and to a positive terminal of a direct current supply source 12 through conductors 340 and 379 and a resistor R4. The negative terminal of the direct current supply source 12 is connected to ground through a conductor 10. In addition, the emitter 15 and collector 18 are connected by conductors 339 and 340, respectively, to a reference alternating current voltage supply network F having a frequency $f$ and including the source of alternating current 324.

The conductors 339 and 340 are coupled through DC blocking capacitors 345 and 347 and respective conductors 343 and 349 to gating terminals 342 and 346 of silicon controlled rectifiers 344 and 348, effectively connected to the reference network supplied by the source of alternating current 324. It should be noted that the line conductor 343 is connected to the ground 245 through a resistor 350 leading to a grounded conductor 341, while the line conductor 349 is connected to the ground 245 through a resistor 374 leading to the grounded conductor 341.

Drive Circuitry

The reference voltage network F includes a rectifying diode 355, silicon controlled rectifiers 344 and 348, and the AC reference voltage source 324 providing an alternating current having a frequency of $f$ applied through a coupling transformer 362, conductor 363 to the rectifying diode 355. This alternating current is then transferred by the rectifier 355 to positive pulses of the frequency $f$ which are in turn applied through the conductor 354 and conductor 368 to the anodes 352 and 366 of the silicon controlled rectifiers 344 and 348.

The silicon controlled rectifier 348 is connected by its gating terminal 346 to the signal circuit E, by the line conductor 349 through the coupling capacitor 347 and conductor 340 to the collector terminal 18 of the NPN-type transistor Q1. In addition, the silicon controlled rectifier 348 is connected by its gating terminal 346 to the ground 245 through the resistor 374 and conductor 341. The silicon controlled rectifier 344 is connected by its gating terminal 342 to the signal circuit E, by the line conductor 343, through the coupling capacitor 345 and conductor 339 to the emitter terminal 15 of the NPN-type transistor Q1. In addition, the gating terminal 342 of the silicon controlled rectifier 344 is connected to the ground 245 through resistor 350 and the conductor 341.

As shown, the silicon controlled rectifiers 344 and 348 are also connected by their cathodes 356 and 370, to the ground 245, through resistors 358 and 372, respectively, and the grounded conductor 341. The anodes 352 and 366 of the silicon controlled rectifiers 344 and 348 are connected to the cathode 367 of the rectifying diode 355 for receiving the positive voltage from the AC reference voltage source 324 through its anode 369. The silicon controlled rectifiers 344 and 348 are arranged to fire selectively depending on the signal received through the phase discriminator 219 from the signal source or comparator 216, which in turn, depends on the relation of the phase of the pulsating DC signal supplied from the comparator 216 to the phase of the pulsating DC reference voltage applied through the rectifier 355 by the source 324; that is, if the phase of the pulsating DC signal from the source or comparator 216 is such as to apply at the output line 340 of the phase discriminator 219 a signal voltage in phase with the reference voltage applied through the rectifier 355 from the source 324, silicon controlled rectifier 348 will fire to produce a positive pulse across resistor 372; and conversely, if the phase of the pulsating DC signal from the source or comparator 216 is such as to apply at the opposite output line 339 of the discriminator 219 a signal voltage in phase with the reference voltage applied through the rectifier 355 from the comparator 216, silicon controlled rectifier 344 will fire to produce a positive pulse across resistor 358. The positive pulses applied through the controlled rectifier 344 will be directed through the alternating current switching network G, while the positive pulses applied through rectifier 348 will be directed through the clearing circuitry H to the driven network 221 of FIGS. 1, 6, and 7, as herein more fully described.

In the operation of the comparator 216, it will be seen that the pulsating DC signal applied through the output conductor 314 to the input of the preamplifier and phase discriminator 219 may reverse in phase dependent upon the comparative condition of the DC signal voltage applied at the point 313 by the condition sensor 210 and the feedback voltage applied at the point 333 through the conductor 334 from summation network 222 of FIGS. 1, 6, and 7.

Thus, for an increasing measured quantity sensed by the condition sensor 210 causing an increase in the DC signal and applied at the point 313 relative to the feedback voltage applied at the point 333, there will be applied through the conductor 314 a pulsating DC voltage in phase with that of the reference voltage applied by the source 324 through the coupling transformer 325 and diode 322 to the base 318 of the transistor 316. However, upon a decrease in the DC signal voltage applied at the point 313 relative to the feedback voltage applied at the point 333, the phase of the DC signal voltage applied through the conductor 314 would be of a phase opposite to that of the reference voltage applied from the source 324.

Thus, the phase of the DC pulsating input voltage applied to the preamplifier and phase discriminator 219 will be in phase with the reference voltage supplied by the source 324 upon the measured quantity sensed by the condition responsive sensor 210 increasing with respect to the followup voltage while upon a decrease in such measured quantity the pulsating DC input signal supplied to the preamplifier and phase discriminator 219 will be opposite in phase to that of the reference voltage from the source 324.

In the drive circuitry 218, the resistors R1 and 380 are so chosen that signals of substantially equal amplitude and of opposite phase appear at points 19 and 21 in the discriminator circuit 219. The signal at point 19 is opposite in phase to that of the pulsating DC input signal from the comparator 216 and the signal at point 21 is in phase with the pulsating DC input signal applied from the comparator 216 through the input conductor 314. The signal at point 19 is applied to the gating terminal 346 of a silicon control rectifier 348 and the signal at point 21 is applied to the gating terminal 342 of the silicon controlled rectifier 344. Either the silicon control rectifier 348 or the silicon controlled rectifier 344 fires, depending upon the phase of the input signal from the source or comparator 216. The silicon controlled rectifier 348 fires when the reference and the voltage at point 19 are in phase to provide a potential across the transistor 372. On the other hand the silicon controlled rectifier 344 fires when the reference voltage and the signal at point 21 are in phase to provide a potential across resistor 358.

It will be seen then that the silicon controlled rectifier 344 fires upon an increase in the quantity measured by the sensor 210 while the silicon controlled rectifier 348 fires upon a decrease in the quantity measured by the condition sensor 210. The silicon controlled rectifier 344 upon firing, controlling the alternating current switching circuit G while the silicon controlled rectifier 348 upon firing controlling the clearing circuit H.

The alternating current switching circuit G includes an alternating current switching voltage source 223 of conventional type operatively connected through the diode 355 to the alternating current reference voltage source 324 and effective to provide at output conductors 402 and 403 alternate positive DC pulses of a frequency of F/2 or half the frequency of the voltage source 324 to alternately open and close a pair of switching transistors 400 and 401 which may be of the NPN-type.

This alternate switching of the transistors 400 and 401 will permit driving pulses received from the reference voltage network F to appear upon the selective firing of the silicon controlled rectifier 344 at either output line conduit A or output line conduit B depending on whether transistor 400 or transistor 401 is closed at that instant and of course upon the selective firing of the silicon controlled rectifier 344 in response to an increasing sensed quantity signal applied through the output conductor 339 of the phase discriminator 219.

These driving pulses supplied through the conduits A and B are utilized to drive the driven circuit 221 of FIGS. 6 and 7 in response to said sensed increasing quantity to in turn effect at the electroluminescent display segments 226 an indication of the increased sensed condition, as hereinafter explained.

In this connection, it may be noted that the cathode 356 of the silicon controlled rectifier 344, besides being connected to the ground 245 through the resistor 358, is connected through a conductor 409 to a collector terminal 410 of the switching transistor 400 and to a collector terminal 412 of the switching transistor 401. These connections are provided for the transmission of the pulses received from the silicon controlled rectifier 344, through the switching transistors 400 and 401 to the output line conductors A and B, respectively.

The switching transistor 400 is shown with its base terminal 414 connected to the pulsating positive direct current voltage applied through conductor 402 from the source 223 at the frequency $f/2$ and the switching transistor 401 is shown with its base 415 connected to the alternate pulsating positive direct current voltage applied through conductor 403 from the source 223 at the frequency $f/2$. Further, the line conductor A is connected to an emitter terminal 416 of the transistor 400 and the line conductor B is connected to an emitter terminal 417 of the transistor 401.

In addition, as illustrated in FIG. 5, the cathode 370 of the silicon controlled rectifier 348, besides being connected to the ground 245 through the resistor 372, is connected to a clearing circuitry H by a line conductor 420.

The clearing circuitry H comprises an NPN-type transistor 422 having its base 434 connected to the line 420 through a resistor 432 and an NPN type transistor 424 having a base 430 effectively connected to line 420 by a delayed circuitry made up of a resistor 426 and a capacitor 428. The transistors 422 and 424 are connected to control a pair of clearing line conductors C and D, respectively. The line conductor C is connected to clear one circuit, such as, the fine circuit shown in FIG. 6, while the line conductor D is connected for a delayed clearing of the coarse circuit shown in FIG. 7.

More specifically, pulses received from the silicon controlled rectifier 348 are directed through the resistor 426 to a base terminal 430 of the transistor 424 and to a plate of the capacitor 428 having an opposite plate connected to the grounded conductor 341. Further, the pulses directed through the silicon controlled rectifier 348 are directed through the resistor 432 to the base terminal 434 of the transistor 422. Connected to collector terminals 436 and 437 of the transistors 422 and 424, respectively, are the line conductors C and D for clearing the fine and coarse circuits of the summation circuitry shown in FIGS. 6 and 7.

Depending on the extent of the signal in a decreasing measured quantity sense received from the comparator 216, the summation circuitry shown in FIGS. 6 and 7 will be cleared by the selective directing of current through emitter terminals 438 and 439 of transistors 422 and 424, respectively. Since the emitter terminals 438 and 439 are connected to ground 245 by line conductor 341, the current will be dissipated through said ground 245 when the transistors are closed as hereinafter more fully described.

Operation Of Switching Network

Assuming that the thermocouple 310, as hereinbefore mentioned, senses a rising temperature, then the driving pulses applied through the controlled rectifier 344 will appear either on line conductor A or the line conductor B depending whether transistor 400 or 401 is closed at that instant. If a train of pulses appears on the line conductors A and B, it will be directed such that the even pulses will be fed into line conductor A and the odd pulses will be fed to line conductor B or conversely, depending on the phase relationship of the pulses and the half frequency operating transistor switches 400 and 401. This alternating output to line conductors A and B can then be used to drive the integrator circuit or driven network 221 shown in FIGS. 6 and 7.

This operation will continue as long as the driving signals are alternately directed through either line conductors A or B, in response to a pulsating direct current voltage at the output line 314 from comparator 216 of a phase indicative of an increasing temperature condition sensed by the thermocouple 310 rendering the controlled rectifier 344 effective. In the event the sensed signal begins to decrease in relation to the feedback voltage at junction 333, then phase of the pulsating direct current voltage at the output line 314 will be of an opposite phase, whereupon the controlled rectifier 344 would no longer be effective while the controlled rectifier 348 would be brought into operation by the opposite phase of the signal to generate a positive pulse across the resistor 372 and thus turn on current to the clearing transistors 422 and 424.

The current will continue pulsating into the transistors 422 and 424 even though a single pulse may clear the fine circuit of the driven network 221 shown in FIG. 6 through the line conductors C, passing current through the transistor 422 and to the ground 245 from the fine circuit. It should be noted that a continuous pulsation of the current through the delayed circuitry made up of resistor 426 and capacitor 428 will build up a charge applied to the capacitor 428 and thereby on the base 430 of the transistor 424 to effectively close the transistor 424 and permit the clearing of the coarse circuitry of the driven circuit shown in FIG. 7. The coarse circuitry will be cleared through the line conductor D passing current through the closed transistor 424 and to the ground 245 from the coarse circuit of the driven network 221 shown in FIG. 7.

Thus, the integrator circuitry shown in FIGS. 6 and 7 are cleared by a shorting of the silicon controlled rectifier 348 controlling the transistors 422 and 424 when the temperature condition sensed by the thermocouple 310 is decreasing.

In summary, as provided in the circuitry of FIG. 5, it is possible to use a sensor such as the thermocouple 310 to sense a measured quantity and to alternately drive and sequentially increase the electroluminescent display segments 226 shown in FIGS. 1 to 4, depending upon the closing and opening of the pair of switching transistors 400 and 401. The alternate output derived will then be used to drive the step integrators shown in FIGS. 6 and 7 to energize the display segments 226.

If the output phase of the comparator 216 is reversed, as upon a decrease in the condition sensed by the thermocouple 310, another pulse will be produced to clear the step integrator circuitry of FIG. 6. The electroluminescent segments 226 will be deenergized through the clearing circuitry or through the transistors 422 for clearing the display segments 226 in small or fine steps or completely clearing the display segments 226 by the coarse clearing circuit through transistor 424. That is, by turning on the clearing transistors 422 and 424, the fine and coarse circuits of the step integrator of FIGS. 6 and 7 may be cleared. The instantaneous and delayed clearing features described herein can thus be used when a portion of the circuit is to be cleared and then another portion is to be cleared at a predetermined time thereafter.

FINE DRIVEN NETWORK

Referring now particularly to FIG. 6, there is shown a fine memory section FM and a fine summation section FS. The fine memory section FM is connected to the electronic drive circuitry 218 just described in FIG. 5 by the input line conductors A and B and the clearing line conductors C and D. As mentioned, the line conductors A and B alternately receive a train of drive pulses from the drive circuitry G of FIG. 5 and the line conductors C and D receive clearing pulses from the clearing circuitry H of FIG. 5, depending upon whether the condition measured by the sensor 210 be increasing or decreasing and the resultant phase relationship of the signal pulses directed through the output conductor 314 to the drive circuitry 218 by the comparator circuit 216.

The phase relationship of the pulses as described depends upon whether a measured parameter, sensed by the thermocouple 310, is increasing or decreasing. If the measured parameter is increasing, the line conductors A and B will receive driving pulses, and if the measured parameter is decreasing, the line conductors C and D will receive clearing pulses.

The line conductors A and B from the electronic drive circuitry 218 of FIG. 5 receive the alternating drive pulses for turning on a plurality of silicon controlled rectifiers 461A to 461F in the driven network 221 of FIG. 6. The silicon controlled rectifiers 461A to 461F in the driven network 221 will stay on, due to their inherent latching effect, even after the drive pulses have disappeared. This switching action will continue to build up voltages received from the input signal of the electronic drive circuitry 218 of FIG. 5 within the fine summation section FS of FIG. 6. These input signal pulses will sequentially turn off a plurality of transistors 451A to 451F in the summation section FS that will divert a supply of direct current into a summing resistor 902, shown in FIG. 7, so as to effect a voltage drop across the summing resistor 902 as a direct current step output for counting the drive pulses received by the system. This step output voltage drop across summing resistor 902 is in turn applied through conductor 334 leading from the terminal 900 of the resistor 902 as a positive going direct current feedback voltage to the junction 333 in the comparator 216 of FIG. 5 to be compared therein with the positive going direct current signal voltage applied at junction 313.

This alternate excitation of lines A and B will continue until the increasing measured parameter stops at a datum level, at which time the integrated information is stored indefinitely in the circuit within the silicon controlled rectifiers until a pulse is applied to the clearing lines C and D.

Therefore, as illustrated in FIGS. 6, the invention provides a fine electronic step integrator having a fine summation section FS and a fine memory section FM. In addition, there is indicated a plurality of circuits having substantially the same number and type of electronic components, and which corresponding components of each circuit have been indicated by like numerals to which there have been applied the suffix A to F to distinguish between the respective components of the first, second, and up to the sixth circuits. It should be noted that only the main components are numbered but each component, having more than one element, may be designated in the same numerical manner but having a different lettered suffix.

The fine summation section FS of FIG. 6 generally comprises six transistors of an NPN-type such as transistors 451A to 451F and their corresponding silicon controlled rectifiers 461A to 461F in the fine driven network 221 connected to the ground 245 by a line conductor G.

In detail the silicon controlled rectifier 461A is connected by its cathode terminal 464A to a blocking resistor 466A and therethrough to the ground line conductor G. The controlled rectifier 461A also has a gate terminal 478A connected by a bleeding resistor 468A to the grounded conductor G in parallel to the blocking resistor 466A.

The gate terminal 478A of the controlled rectifier 461A is further connected through a diode 474A and a line conductor 470A to the input line conductor A. Thus, the input line conductor A is connected by the line conductor 470A to an anode 472A of the diode 474A having a cathode 476A connected to the gate terminal 478A of the first silicon controlled rectifier 461A. In addition, there is connected to the gate terminal 478A a line conductor 480A leading to an anode 482A of a diode 484A having a cathode 486A connected by a line conductor 488A to the clearing line conductor C.

It should be noted that the diode 474A is operably connected between the input line conductor A and the gate terminal 478A of the silicon controlled rectifier 461A so that it can direct positive going input driving pulses from the drive circuitry of FIG. 5 through the line conductor A to said gate terminal 478A. In addition, the diode 484A is connected to the clearing line conductor C so as to permit negative going clearing pulses to be applied to the gate terminal 478A from the clearing line conductor C to turn off the controlled rectifier 461A upon a clearing signal being applied at the drive circuitry of FIG. 5 rendering the transistor 422 conductive so that negative going clearing pulses may be applied through said line conductor C and the transistor 422 from the grounded connection 245.

In the second detailed circuitry of silicon controlled rectifier 461B, the input line conductor B is connected by line conductor 470B to an anode 472B of a diode 474B having a cathode 476B connected to a gate terminal 478B of the second silicon controlled rectifier 461B. The diode 474B is operable in the same manner as the diode 474A to direct positive going input drive pulses from the line conductor B to the gate terminal 478B of the silicon controlled rectifier 461B.

A line conductor 480B leads from the gate terminal 478B of the silicon controlled rectifier 461B to an anode 482B of a diode 484B having a cathode 486B connected by a line conductor 488B to the clearing line conductor C. The operation of this part of the circuit is the same as for the circuit used for the silicon controlled rectifier 461A to clear the silicon controlled rectifier 461B.

The silicon controlled rectifiers 461C and 461E are provided with the same electrical circuitry as the silicon controlled rectifier 461A. Each of these silicon controlled rectifiers 461C and 461E have gating terminals connected to the line conductors A and C as shown in FIG. 6 in the same manner as silicon controlled rectifier 461A.

Also, the silicon controlled rectifiers 461D and 461F are provided with the same electrical circuitry as the silicon controlled rectifier 461B. These silicon controlled rectifiers 461D and 461F have gating terminals connected to line conductors B and C as shown in FIG. 6 in the same manner as silicon controlled rectifier 461B.

It should be noted, therefore, that the circuitry for each silicon controlled rectifier is substantially the same. In this manner, all of the silicon controlled rectifiers may be either alternately driven by positive-going input drive pulses received through line conductors A and B, or cleared by negative-going clearing pulses received from line conductor C.

In addition to the silicon controlled rectifier circuitries herein described, there is provided in the memory section FM an additional transistor 490 of an NPN type having a base terminal 492 connected through a resistor 494 by a line conductor 496 to a junction 563. The junction 463 is interposed between an anode 560E of a Zener diode 588E and the anode 568E of the diode 566E having a cathode 564E connected through resistor 466F to the ground line conductor G. In addition, the transistor 490 has an emitter terminal 498 connected to the ground line conductor G and a collector terminal 500 connected at a junction 501 to cathodes 502 and 504 of diodes 506 and 508 respectively. An anode 510 of the diode 506 is connected to the line conductor A, and an anode 512 of the diode 508 is connected to the line conductor B.

Furthermore, as shown in the fine memory section FM, of FIG. 6, there is interposed in the line conductor A, between an anode 472E of the diode 474E and the anode 510 of the diode 506 a line resistor 514 and interposed in the line conductor B between an anode 472F of the diode 474F and the anode 512 of the diode 508 a line resistor 516.

In addition as outlined before, the silicon controlled rectifiers 461A to 461F are interconnected with their corresponding electroluminescent photoconductor matrix shown in FIGS. 8 to 11 by six line conductors 521A to 521F leading to electroluminescent photoconductor matrix F1 to F6, respectively, and four line conductors 522A to 522D leading to electroluminescent photoconductor matrix F7 to F10, respectively. Each of these 10 line conductors 521A to 521F and 522A to 522D are connected to the respective 10 fine electroluminescent capacitor strips F1 to F10 as shown in FIG. 8 or as shown in FIG. 11, and as hereinafter more fully described. That is, line conductor 521A is connected to one plate of the fine electroluminescent capacitor strip F1, shown in FIG. 8, while line conductor 522A is connected to one plate of the fine electroluminescent capacitor strip F7, shown in FIG. 8. In this way, the fine memory section FM of FIG. 6 is provided with the line conductors 521A to 521F and the line conductors 522A to 522D for connection to corresponding plates of the fine electroluminescent capacitor strips F1 to F6 and F7 to F10 shown in FIG. 8.

Connected to the line conductors 521A and 522A at junction 524A is an anode 525A of the silicon controlled rectifier 461A. In addition, a cathode 526A of a diode 528A is connected to the anode 525A of the silicon controlled rectifier 461A at the junction 524A. Further, an anode 530A of the diode 528A is connected at junction 532 to a cathode 534A of a diode 536A. The anode 530A and the cathode 534A are further connected at a junction 533A to an anode 538A of a diode 540A. The diode 540A has a cathode 537A which is connected to a line conductor 542 leading to an alternating current source 544 directing current through a transformer 546 as hereinafter more fully described.

An anode 548A of the diode 536A is connected through a resistor 550A and a line conductor 554 to a positive terminal of a suitable direct current source 552 having a negative terminal connected to ground 245. The anode 548A of the diode 536A is also connected to a cathode 556A of a Zener diode 558A.

A cathode 464B of the silicon controlled rectifier 461B of the second circuit is connected to a cathode 564A of a diode 566A which has an anode 568A also connected to an anode 560A of the Zener diode 558A at a junction 562A. At the junction 562A, the anode 560A of the Zener diode 558A and the anode 568A of the diode 566A, respectively, are connected by a line conductor 572A and resistor 574A to a base terminal 570A of the NPN-type type transistor 451A. As shown in the fine memory section FM, voltages derived from the direct current source 552 are divided within the circuitry of silicon controlled rectifier 461A. In the silicon controlled rectifier circuit 461A, the positive going direct current voltage coming through line conductor 554 is divided by the resistor 550A, the Zener diode 558A and a blocking resistor 466B of the silicon controlled rectifier 461B. In addition, voltage received through the line conductor 554 is divided in the corresponding circuitry of the second silicon controlled rectifier 461B by the resistor 550B, Zener diode 558B and a blocking resistor 466C of the silicon controlled rectifier 461C.

As brought out before, each silicon controlled rectifier circuitry is substantially the same in which the corresponding elements of each circuit have been indicated by like numerals to which there has been applied the suffix A to F to distinguish between the respective elements of the silicon controlled rectifiers 461A to 461F. Therefore, voltages derived from the direct current source 552 are also divided in the third, fourth, and fifth silicon controlled rectifier circuitry of silicon controlled rectifier 461C to 461E in the same manner as the circuitry silicon controlled rectifiers 461A and 461B. The last silicon controlled rectifier 461F provided in the system has a voltage divided between a last resistor 550F, a last Zener diode 558F and a resistor 608.

It should be noted, in the operation of the system, when the silicon controlled rectifiers are not open, the reverse current breakdown characteristic of the Zener diodes 558A to 558E is such that the current is divided in the silicon controlled rectifier circuitry by the Zener diodes in a reversed sense, to the cathode 464B to 464F of the succeeding silicon controlled rectifier. This is provided to block any pulses directed to the gate terminals 478B to 478F that would permit the flow of electrons through the silicon controlled rectifiers 461B to 461F other than sequentially, as herein more fully described.

As shown in the fine summation section FS of FIG. 6, the switching transistor 451A has an emitter terminal 580A connected to a first diverting line conductor 582 leading to the grounded connection 245. A collector terminal 584A of the transistor 451A is connected through a resistor 486A to a direct current line conductor 588 which is connected to a positive terminal of a suitable source of direct current supply 590 having a negative terminal connected to ground 245. The end of the resistor 586A connected to the collector terminal 584A of the transistor 451A is further connected to an anode 592A of a diode 594A having a cathode 596A connected to a second diverting line conductor 598 leading to a terminal 900 of the summing resistor 902 having an opposite terminal connected to a grounded conductor 245, as shown by FIG. 7. Further, as illustrated in FIG. 6, the transistors 451B to 451F are also connected to the line conductors 582, 588, and 598 and operative in substantially the same manner as the transistor 451A.

The diodes 594A to 594F are operative upon a predetermined voltage drop of, for example, one-half a volt, being applied across the anode and cathode thereof to connect the corresponding resistor 586A to 586F to the second diverting line conductor 598 leading to the terminal 900 of the summation resistor 902. The arrangement is such then that upon the corresponding transistor 451A to 451F being rendered conductive so as to connect the respective resistors 586A to 486F directly to the first diverting line conductor 482, the resulting voltage drop across the corresponding diode 594A to 594F is insufficient to render such diode operative to effect the diverting action, but upon one or the other of the transistors 451A to 451F being opened, the resulting voltage drop across the corresponding diode 594A to 594F is sufficient to render the same effective to connect the corresponding resistor 586A to 586F controlled by the opened transistor 451A to 451F to the second diverting line conductor 582 to in turn control the voltage drop across the summation resistor 902 and thereby the feedback voltage applied through the conductor 334 upon the firing of the rectifier 461A to 461F, as hereinafter explained in greater detail.

In the circuitry of the silicon controlled rectifier 461F, there is provided a capacitor 600 interposed between a cathode 464F of the silicon controlled rectifier 461F and the ground line conductor G. The capacitor 600 serves by bypass AC noise across resistor 466F. In addition, leading to the base of the switching transistor 451E, there is provided a resistor 574E connected through a conductor 572E to a junction 562E, which junction is interposed between a cathode 564E of the diode 566E and the cathode 464F of the silicon controlled rectifier 461F.

The reverse current breakdown characteristic of the Zener diode 566E is such that so long as the controlled rectifier 461E is nonconductive there is applied through the Zener diode 558E a reverse flow of current which acts through the diode 566E to render the switching transistor 451E conductive and to apply a positive back bias to the cathode 464F of the controlled rectifier 461F to prevent the firing thereof. However, upon the controlled rectifier 461E firing, the bias applied to the cathode of the Zener diode 558E is reduced so that the Zener diode 558E terminates the flow of reverse current to cause the switching transistor 451E to open and the back bias applied to the cathode 464F is withdrawn to permit the firing of the controlled rectifier 461F.

Further, in the silicon controlled rectifier 461F circuitry, there is also provided a Zener diode 558F having a cathode 556F connected to an anode 548F of a diode 536F. In addition, the cathode 556F of the Zener diode 558F is connected to the positive terminal of the direct current voltage 552 through a resistor 550F and conductor 554. An anode 560F of the zener diode 558F is connected through a resistor 608 to the line conductor 496 leading to the base 492 of the NPN type switching transistor 490. In addition, the anode 560F of the Zener diode 558F is connected to a base 570F of the NPN-type switching transistor 451F through a resistor 574F.

The reverse current breakdown characteristic of the Zener diode 558F is such that so long as the controlled rectifier 461F is nonconductive, there is applied through the Zener diode 558F a reverse flow of current which acts to render the switching transistors 451F and 490 conductive. However, upon the controlled rectifier 461F firing, the bias applied to the cathode of the Zener diode 558F is reduced so that the Zener diode 558F terminates the flow of reverse current to cause the switching transistor 451F to open and the back bias applied through resistor 608 to the base 492 of the switching transistor 490 to be withdrawn to permit the subsequent opening of the switching transistor 490 upon a refiring of the controlled rectifier 461E, as hereinafter explained.

The NPN-type transistor 451F has an emitter terminal 580F connected to the grounded line conductor 582 and a collector terminal 584F connected through a resistor 586F to the line conductor 588 which in turn is connected to the positive terminal of a suitable source of direct current voltage 590 having a negative terminal connected to ground through the grounded conductor 245. As in the other circuitries of the fine summation section FS, the line conductors 588 and 598 are interconnected through the resistor 586F and the diode 594F upon the switching transistor 451F being opened.

The line conductor 598, shown in FIG. 6, is connected to the line conductor 598, shown in FIG. 7, and thereby to the terminal 900 of the summation resistor 902. The voltage drop across the resistor 902 is applied as a positive going direct feedback voltage through the conductor 334 leading from the terminal 900 of FIG. 7 to the conductor 334 of FIG. 5 and thereby to the junction 333 of the comparator 216 so that the opening and closing of the switching transistors 451A to 451F act to control the positive feedback voltage applied at the junction 333.

Further, as shown, the line conductor 582 is connected to a multiplexing circuitry 612 at junction 614. Connected to the junction 614 are a pair of two-diode coil circuits, a fine coil circuit 616 and a coarse coil circuit 618. The fine coil circuit 616 comprises a coil 620 having one terminal 622 connected through a common line conductor 623 to a plate of each of the fine electroluminescent capacitor strips F6 to F10. As shown by FIG. 8, opposite plates of the capacitor strips F6 to F10 are connected to the conductors 521F, 522A, 522B, 522C, and 522D controlled by the silicon controlled rectifiers 461F, 461A, 461B, 461C, and 461D, respectively, of FIG. 6.

The coil 620 includes another terminal 624 connected at a junction 626 to an anode 628 of one diode 630 having a cathode 632 connected to a junction 634 which in turn is connected to the line conductor 521F. The junction 626 is further connected to a cathode 636 of a diode 638 having an anode connected to the junction 614 to which there is connected the line conductor 582 leading to the ground 245.

The line conductor 521F leads from junction 634 to a plate of the electroluminescent capacitor strip F6, shown in FIG. 6, while the junction 634 is further connected to the line conductor 542 and to the resistor 635 leading to the anode of the diode 528F and to the cathode of the diode 536F, as shown in FIG. 6.

The coarse coil circuit 618 comprises a coil 642 having one terminal 644 connected through a common line conductor 645 to a plate of each of the coarse electroluminescent capacitor strips C11 to C19, as shown by FIG. 8, while opposite plates of the capacitor strips C11 to C19 are connected respectively to the conductors 722A through 722I controlled by the silicon controlled rectifiers 725A to 725I, respectively, of FIG. 7. Coil 642 has another terminal 646 connected at a junction 648 to a cathode 650 of a diode 654 having an anode 652 connected to the junction 614 from which leads the grounded conductor 582. Also connected to junction 648 is an anode 656 of a diode 658 having a cathode 660 connected through a common line conductor 662 to the coarse circuitry shown in FIG. 7. The two coil circuits 616 and 618 are utilized to produce a multiplexing action in the fine and coarse control circuitry, as hereinafter described in the operation of the system.

As provided in FIG. 6, the alternating current source 544 comprises one terminal 663 connected to junction 614 through a line conductor 665 and another terminal 667 connected to a line conductor 669. There is also connected across the terminal 663 and 667 of the source of alternating current 544 a primary winding 666 inductively coupled to the secondary windings 620 and 642 of the transformer 546. The line conductor 669 is connected to a plate of each of the electroluminescent fine capacitor strips F1 to F5. As shown by FIG. 8, opposite plates of the capacitor strips F1 to F5 are connected respectively to the conductors 521A to 521E controlled by the silicon controlled rectifiers 461A to 461E, respectively, of FIG. 6.

The line conductor 669 is also connected to a plate of each of the coarse capacitor strips C1 to C10. Opposite plates of the capacitor strips C1 to C10 are connected respectively to the conductors 721A to 721J controlled by the silicon controlled rectifiers 761A to 761J, respectively, of FIG. 7.

COARSE DRIVEN NETWORK

It should be noted that in addition to the drive line conductors A and B, the coarse clearing line conductor D, and the line conductor G leading to ground 245, the fine driven network of FIGS. 6 and the coarse driven network of FIG. 7 are interconnected by power line conductors, including the conductor 589 leading from the positive terminal of the direct current source 590, the conductor 662 leading through diode 658 from the coil 642 of the coarse coil circuit 618, a conductor 671 leading from the positive terminal of the direct current source 552, and the second diverting line conductor 598.

In referring to FIG. 7, there is shown a coarse electronic step integrator having a coarse summation section CS and a coarse memory section CM. In the coarse circuitry of the summation section CS there is provided 10 NPN-type transistors 751A to 751J, and in the coarse circuitry of the memory section CM there is provided 10 silicon controlled rectifiers 761A to 761J. Interconnecting the transistors 751A to 751J and the silicon controlled rectifiers 761A to 751J are Zener diodes, diodes, and capacitors in which corresponding numerals indicate corresponding parts as in the circuitry shown in FIG. 6, as hereinafter more fully described.

In addition, there is indicated a plurality of circuits having substantially the same number and type of electronic components with the corresponding components of each circuit indicated by like numerals to which there has been applied the suffix A to J to distinguish between the respective components of the first, second, and up to the last circuit. It should be noted that only the main components were numbered in the succeeding circuits, having more than one element, but it should be noted that the designation of the elements is the same numerically with a different lettered suffix.

In detail, the first silicon controlled rectifier circuit of the coarse driven network of FIG. 7 comprises the silicon controlled rectifier 761A connected by its anode 725A at junction 724A to two line conductors 721A and 722A which in turn are connected to a plate of the first coarse electroluminescent capacitor strip C1 and to a plate of the eleventh coarse electroluminescent strip C11, respectively, as shown in FIG. 8. In addition, a cathode 764A of the silicon controlled rectifier 761A is connected to the ground line conductor G through a resistor 766A. Again, the silicon controlled rectifier 761A includes a gate terminal 778A which is connected at junction 756A to a line resistor 768A and thereby to the ground line conductor G. The gate terminal 778A is also connected to the driving line conductor A through a diode 774A and to the clearing line conductor D through a diode 784A. The gate terminal 778A is connected at a junction 775A to a cathode 776A of the diode 774A and to an anode 782A of the diode 784A. An anode 772A of the diode 774A is connected to the driving line conductor A, while a cathode 786A of the diode 784A is connected to the clearing line conductor D.

In addition, the silicon controlled rectifier 761A circuitry includes an anode 838A of a diode 840A connected to line 721A at a junction 833A and a cathode 834A of a diode 836A connected to the line conductor 721A at junction 832A. The diode 840A includes a cathode 837A connected to the line conductor 662 which in turn is connected, as shown in FIG. 6, to the cathode 660 of the diode 658 in the coarse coil circuitry 618. An anode 848A of the diode 836A is connected at a junction 810A to a resistor 850A and through the resistor 850A to the line conductor 671 leading from the positive terminal of the DC source 552. An anode 828A of the diode 830A is connected to the cathode 834A of the diode 836A at the junction 832A by the conductor 721A and, in addition, the anode 838A of the diode 840A is connected to the conductor 721A at junction 833A. In addition, a cathode 826A of the diode 830A is connected to the anode 725A of the silicon controlled rectifier 761A.

A resistor 850A is connected at junction 810A to a cathode 856A of a Zener diode 858A and to the anode 848A of the diode 836A. In addition, an anode 860A of the Zener diode 858A is connected to an anode 868A of a diode 866A. Connected between the anode 860A of the Zener diode 858A and the anode 868A of the diode 866A is a junction 862A from which leads a line conductor 872A which is connected through a resistor 874A to a base terminal 870A of a NPN-type transistor 751A. In addition, a line conductor 873A leads from the junction 862A and is connected by a resistor 834 to a base terminal 792 of an NPN-type transistor 790. The base 792 is further connected by a resistor 836 to the ground line conductor G. A capacitor 835 is connected across the resistor 836 so as to bypass AC noise across the resistor 836.

In the circuitry of the silicon controlled rectifier 761A, the diode 866A has a cathode 864A connected to a cathode 764B of the second silicon controlled rectifier 761B. In addition, the cathode 864A of the diode 866A and the cathode 764B of the second silicon controlled rectifier 761B are connected to the ground line conductor G through a resistor 766B.

As illustrated in the drawing of FIG. 7, the silicon controlled rectifiers 761A to 761I have substantially the same operating circuitry, except for the last silicon controlled rectifier 761J which is used as a transfer switch. The gate terminal 778J of the silicon controlled rectifier 761J is connected to the drive line conductor B through a diode 774J having an anode 772J connected to the conductor B and a cathode 776J connected to the gate terminal 778J. The gate terminal 778J is further connected to a collector element of an NPN-type transistor 790 having an emitter element connected to the clearing line D. The arrangement is such that in a normal at rest condition of the network there is applied through the conductor 873A and resistor 834 a positive bias to the base of the transistor 790 to render the transistor conductive between the collector and emitter to connect the gating terminal 778J of the controlled rectifier 761J to the clearing line D.

Further, in the silicon controlled rectifier 761J circuitry, there is provided a diode 830J having a cathode connected to the anode of the controlled rectifier 761J and an anode connected to the cathode of the diode 836J. The anode of the diode 830J is further connected through a resistor 835 to the conductor 721J and thereby to a plate of the coarse capacitor strip C10 of FIG. 8 and through the conductor 662 of FIG. 7 to the conductor 662 of FIG. 6 and thereby through the diode 658 to the coil 642 of the coarse coil circuit 618.

An anode 848J of the diode 836J is further connected to a plate of a clearing capacitor 854 having an opposite plate connected to the clearing line D. A cathode 856J of a Zener diode 858J is connected at junction 810J to the anode 848J of the diode 836J. The Zener diode 858J has an anode 860J which is connected through a conductor 872J and resistor 874J to a base 870J of the last transistor 751J. As illustrated in FIG. 7, connected to the emitter terminals 880A to 880J of the transistors 751A to 751J, respectively, is the first diverting line conductor 582 which in turn is connected to ground 245.

In addition, there is provided the second diverting line conductor 598 which is connected to the collector terminals 884A to 884J of the transistors 751A to 751J, respectively, through diodes 894A to 894J, respectively in which each of the diodes 894A to 894J has a cathode element connected to the second diverting line conductor 598 and an anode element connected to corresponding collector terminals 884A to 884J, respectively.

The line conductor 598 is connected to a junction 900 which in turn is connected to one terminal of a summation resistor 902 having an opposite terminal connected to ground 245. The line conductor 589 is connected through resistors 886A to 886J to the collector terminals 884A to 884J, respectively, of the transistors 751A to 751J and to the anode elements of the diodes 894A to 894J, respectively.

OPERATION OF COARSE DRIVEN NETWORK

In the operation of the coarse circuitry of FIG. 7, starting within the silicon controlled rectifier 761A and up to silicon controlled rectifier 761J, sensed signal pulses produce direct current voltage drive pulses from the circuitry of FIG. 5 which pulses are alternately directed through line conductors A and B and through conductor A to the gating terminals of the silicon controlled rectifiers 761A and 761C to 761I operatively connected by the respective diodes 774A and 774C to 774I to the conductor A, while the drive pulses directed through line conductor B are directed to the gating terminals of the silicon controlled rectifiers 761B and 761J operatively connected by diodes 774B and 774J, respectively, to the conductor B, as shown by FIG. 7.

In addition, direct current voltage from the direct current source 552 of FIG. 6 is directed through line conductor 671 to the line conductor 671 of FIG. 7 to be divided within line resistors, Zener diodes, and cathode resistors of the coarse circuitry as herein provided for the fine circuitry of FIG. 6. That is, for example, in the coarse circuitry of silicon controlled rectifier 761A the voltage from the positive terminal of the direct current source 552 is directed from the line conductor 671 through the resistor 850A and thereby to the cathode 856A of the Zener diode 858A which has a reverse current breakdown characteristic such that with the silicon controlled rectifier 761A being in a nonconductive condition the Zener diode 858A breaks down so as to permit current flow there through to the cathode 764B of the succeeding silicon controlled rectifier 761B and through the blocking resistor 766B to the ground line conductor G. The voltage from the direct current source 552 is continuously divided between each individual resistor, Zener diode, and blocking resistor of the next succeeding silicon controlled rectifier 761C to 761J in like manner.

Due to the presence then of direct current voltage at the junctions 862A to 862I between the anode of the Zener diodes 858A to 858J and the anode of the diodes 866A to 866I and at the line 872J leading from the anode of the Zener diode 858J the bases of the transistors 751A to 751J have a positive bias applied thereto and the transistors are saturated so that any direct current voltage from the direct current source 590 and applied through conductor 589 is shorted through the transistors 751A to 751J to the first diverting line conductor 582 and thereby to the ground 245.

It should be understood that the presence of direct current voltage applied through the corresponding Zener diode and across each blocking resistor starting with blocking resistor 766B of silicon controlled rectifier 761B provide back biasing voltage to the gate terminal of the succeeding silicon controlled rectifier. This back biasing voltage is utilized so that when a positive pulse is applied to the gate terminals of the silicon controlled rectifiers, the silicon controlled rectifiers cannot fire. The silicon controlled rectifiers can only fire if the back biasing voltage is removed from their cathodes. That means that when a positive pulse of a magnitude equal to that of the back biasing voltage is applied by the electronic drive circuitry, shown in FIG. 5, through line conductor A, only silicon controlled rectifier 761A will turn on even though the pulse will appear at gate terminals of the other silicon controlled rectifiers 761C to 761I whose gate terminal is connected to the line conductor A.

Similarly, with the silicon controlled rectifier 761A being in a nonconductive state upon a pulse from the drive circuitry of FIG. 5 being directed through the line conductor B, the silicon controlled rectifier 761B which is connected to the line conductor B through diode 774B would not fire or be turned on since there would be a back biasing voltage directed from the direct current source 552 through conductor 671 and impinging on the cathode 764B of the silicon controlled rectifier 761B due to the reverse current breakdown characteristic of the Zener diode 858A. The voltage would be directed from the line conductor 671 to be divided by resistor 850A, Zener diode 858A, and the cathode resistor 766B. The voltage impinging on the cathode 764B of the controlled rectifier 761B would then prevent the gate terminal 778B from firing the silicon controlled rectifier 761B.

On the other hand, if a positive pulse is directed through the line conductor A which is connected to the gate terminal 778A of the silicon controlled rectifier 761A, there being no back biasing voltage on the cathode 764A, the silicon controlled rectifier 761A would fire. Upon the silicon controlled rectifier 761A firing, the breakdown voltage applied to the cathode of the Zener diode 858A would drop with the flow of current through the diodes 836A and 830A to the anode 725A of the now conductive rectifier 761A and through the rectifier 761A, resistor 766A and conductor G to the ground 245.

The reverse current breakdown characteristic of the Zener diode 858A is such that with the drop in the voltage at the cathode 856A the Zener diode 858A would prevent reverse current flow therethrough, whereupon the back biasing voltage on silicon controlled rectifier 761B would be diverted from the cathode 764B of the silicon controlled rectifier 761B. That is, the Zener diode 858A would effectively close so that the voltage from the source 552 would no longer produce a back biasing voltage on the cathode 764B of the silicon controlled rectifier 761B. Thereafter, the next pulse, directed through the line conductor B, would be effective on the gate terminal 778B of the silicon controlled rectifier 761B to cause the silicon controlled rectifier 761B to fire or close. The blocking action of the Zener diode upon the firing of the preceding silicon controlled rectifier is also effective to permit the positive bias applied to the corresponding transistor 751A to 751J and 790 to be selectively bled to ground through the rectifier 866A to 866I and resistors 766B to 766J so as to render the transistors 751A to 751J selectively nonconductive, whereupon the voltage applied through conductor 589 from the source 590 with the opening of the transistors 751A to 751J is selectively effective through resistors 586A to 586J and the diodes 594A to 594J to increase the voltage drop at the junction 900, as hereinafter explained.

Operation Of Fine And Coarse Circuitry

In detail, therefore, referring to FIGS. 5, 6, and 7 of the drawing, supposing that in response to operation of the condition sensor 210 there is effected from the drive circuitry 218 a first drive pulse which is directed through the line conductor B, it will be seen that a second pulse need thereafter to be directed through the line conductor A to turn on the first silicon controlled rectifier 461A of the driven network 221 of FIG. 6 so as to direct current through the first circuitry of the silicon controlled rectifier 461A.

This second pulse will turn on the silicon controlled rectifier 461A. That is, since the silicon controlled rectifier 461A is not affected by any back biasing current, since it is the first silicon controlled rectifier in the circuit, it will be fired and it will remain in this condition permitting current to flow through it. In addition, since the current is directed through the silicon controlled rectifier 461A, the back biasing voltage acting on the cathode 556A of the Zener diode 558A will be reduced to a particular lower voltage, at which voltage the Zener diode 558A will stop conducting in the reverse sense so that the voltage at junction 562A will be similarly reduced leaving the silicon controlled rectifier 461B in a standby state by the resulting reduction in the back biasing voltage acting at its cathode 464B.

Furthermore, the reduction in the voltage at junction 562A will reduce the biasing voltage at the base terminal 570A of the switching transistor 451A to turn off the transistor 451A to divert the current coming from the direct current source 590 and applied through the line conductor 588 and resistor 586A to the collector 584A of the transistor 451A from the first diverting line conductor 582 connected to the emitter 580A thereof to the second diverting line conductor 598 through the diode 594A to add a fine voltage step to the terminal 900 of the summation resistor 902 to which the conductor 598 is connected, as shown in FIG. 7.

The value of each of the fine voltage step resistors 586A to 586E are of an equal relatively high resistance value of, for example, approximately 10 Kilo-ohms, and so calibrated in relation to the system as to apply upon the firing of its corresponding control transistor a unit step voltage increase at terminal 900 and across the summation resistance 902 having a relatively low resistance of, for example, around 2 ohms. The unit step voltage so applied being equal to 1/11 of the greater coarse step voltage increase applied by each of the coarse voltage step resistors 886A to 886I upon the firing of their corresponding control transistor.

The fine voltage step resistor 586F, however, has a somewhat lower resistance value than the value of the resistors 586A to 586E, but a higher value than the coarse resistors 886A to 886I. The resistor 586F may have a resistance value, for example, of about 2 Kilo-ohms, so calibrated as to apply upon the firing of its control transistor 451F a voltage increase at terminal 900 and across the summation resistor 902 of a value equal to a six unit step voltage increase or a voltage value six times that applied by one of the fine voltage step resistors 586A to 586E to effect the integrated information in the fine memory section FM.

Similarly, the coarse voltage resistors 886A to 886I are each of an equal lower resistance value than the resistor 586F of, for example, about 900 ohms each, so calibrated as to apply at terminal 900 upon the firing of its control transistor an 11 unit step voltage increase or a voltage increase across the summation resistance 902 of a value equal to 11 times that applied by the connection of one of the fine step resistors 586A to 586E thereto. Finally, the last resistor 886J has a still lower resistance value of, for example, about 90 ohms, so calibrated as to apply at terminal 900 upon the firing of its control transistor 761J a 110 unit step voltage increase or a voltage increase across the summation resistance 902 of a value equal to 10 times that applied by one of the coarse step resistors 886A to 886I upon the firing of its corresponding control transistor 751A to 751I, respectively.

The operation of the fine driven network 221 may be continued then after the firing of the silicon controlled rectifier 461A by a succeeding pulse being directed by the drive circuitry 218 through the line conductor B to the gate terminal 478B of the silicon controlled rectifier 461B. Since the back biasing voltage applied at the cathode 464B has been previously removed by the firing of the controlled rectifier 461A, the succeeding pulse coming from line conductor B to the gating terminal 478B will turn on the second silicon controlled rectifier 461B to permit the conduction of current through the silicon controlled rectifier 461B and through the cathode resistor 466B of the silicon controlled rectifier 461B. Here again, since the voltage applied at the cathode of the Zener diode 558B would be reduced upon the firing of the controlled rectifier 461B the Zener diode 558B will stop conducting in the reverse direction so that the voltage at the junction 562B is thereupon reduced whereupon the biasing voltage applied at the base terminal 570B of the transistor 451B is reduced so as to render the transistor 451B nonconductive so as to divert current through diode 594B and from the first diverting line conductor 582 to the second diverting line conductor 598 to add another or second unit fine voltage step at the terminal 900 of the summation resistor 902.

A further pulse can then be directed through the line conductor A into the gate terminal 478C of the silicon controlled rectifier 461C. Here again, since the second silicon controlled rectifier 461B is conducting, and the back biasing voltage at the junction 562B has been removed, the silicon controlled rectifier 461C will be turned on by the positive pulse applied through conductor B to permit line current to be diverted from the Zener diode 558C into the silicon controlled rectifier 461C. This will in turn reduce the biasing voltage applied at the cathode of the Zener diode 558C to switch off the Zener diode 558C and thereby the biasing voltage at junction 562C and applied to the base of the transistor 451C to thereby add still another fine unit voltage step to the feedback voltage applied at terminal 900 of the summation resistor 902. This will continue until the pulse signals received from the drive circuitry 218 shown in FIG. 5, and alternately applied through conductors A and B cease, designating that a datum plane of a sensed parameter has been reached by the feedback voltage applied at terminal 333 balancing the signal voltage applied at terminal 313 by the condition sensor 210.

However, in the first cycle of operation of the fine driven network 221 of FIG. 6, upon the transistors 451A to 451E being sequentially opened, the same remain open until upon a succeeding drive pulse being applied through the conductor B to the gate terminal 478F of the silicon control rectifier, the firing of the sixth silicon controlled rectifier 461F causes the clearing capacitor 454, having a plate 453 connected to the cathode 556F of the Zener diode 558F and an opposite plate 455 connected to the clearing line C, to pick up the decrease in the DC bias applied to the cathode 556F upon the firing of the controlled rectifier 461F so as to act as a clearing capacitor by applying a negative going pulse through the clearing line C and the clearing diodes 484A to 484E to the gate terminals of the controlled rectifiers 461A to 461E which terminates the firing thereof and applies a positive going pulse to the plate 455 of the capacitor 454 while a negative going pulse is applied to the opposite plate 453 of the capacitor 454 by the firing of the controlled rectifier 461F. The controlled rectifier 461F, simultaneously with the firing thereof, effects a time delay action by applying a positive bias to the plate 601 of the capacitor 600 which delays the build up of a positive bias across the resistor 466F connected to the cathode 464F of the controlled rectifier 461F so as to prevent the subsequent negative going clearing pulse effected by the application of the negative going pulse at plate 453 and resulting positive going pulse at plate 455 of the capacitor 454 from turning off the controlled rectifier 461F at the termination of the first cycle of operation of the fine driven network 221 of FIG. 6.

In addition, the voltage drop across the resistor 466F resulting upon the firing of the controlled rectifier 461F applies a positive bias at the junction 562E and to the base terminal of the transistor 451E through conductor 572E and resistor 574E which acts to return the transistor 451E to a conductive state rendering resistor 586E ineffective to apply a step voltage to the terminal 900 of the summation resistor 902 and thereafter maintains the transistor 451E in a conductive state so long as the controlled rectifier 461F remains conductive. Further, the controlled rectifiers 461A to 461E in the sequential firing thereof during the first cycle of operation serve to effectively connect to the ground conductor G the conductors 521A to 521E so that the fine electroluminescent capacitor strips F1 to F5 may be effectively illuminated by the alternating current applied through conductor 669 leading to one terminal of an AC source 544 having an opposite terminal connected to grounded conduit 582.

Termination of the firing of the controlled rectifiers 461A to 461E by the firing of the controlled rectifier 461F does not effect a deenergization of the fine electroluminescent strips F1 to F5, but rather the firing of the controlled rectifier 461F provides a holding action in that the fine electroluminescent capacitor strips F1 to F5 continue to be illuminated from the source of alternating current 544 by a positive half-wave being applied causing current to flow from terminal 667 of the source 544 through conductor 669 to one plate of each of the capacitor strips F1 to F5 while current from the opposite plates flow through lines 521A—521E, diodes 540A to 540E, conductor 542, junction 634, conductor 521F, resistor 635, diode 528F, the controlled rectifier 461F and resistor 466F leading to the grounded conductor G and returning through grounded conductor 582 and conductor 665 to opposite terminal 663 of the source 544.

Upon an opposite negative half-wave being applied, current will flow from one plate of each of the capacitor strips F1 to F5 through conductor 669 to the terminal 667, while there will be effected a flow of positive going current from the terminal 663 through the conductor 665 to the grounded conductor 582, through grounded conductor 245 leading to the negative terminal 245 of the source 552 and through conductor 554, resistors 550A to 550E, diodes 536A to 536E, and through conductors 521A to 521E to the other plate of each of the capacitor strips F1 to F5.

Moreover, the firing of the controlled rectifier 461F effectively illuminates the electroluminescent capacitor strip F6 by alternating current applied at the opposite plates of the electroluminescent capacitor strip F6 by a conductor 623 leading from a terminal 622 of the coil 620, which is inductively coupled to the primary winding 666 so as to apply during a positive half-wave of the alternating current a flow of current through the conductor 623 to one plate of the electroluminescent capacitor strip F6, while a return flow of current is effected from the opposite plate of the capacitor strip F6 through a conductor 521F, resistor 635, diode 528F, the controlled rectifier 461F, and resistor 466F to the grounded conductor G so as to return through the grounded conductor 582 to the anode 640 of the diode 638 to the negative terminal 626 of the coil 620.

During a negative half-wave of the alternating current, a flow of current is effected through the conductor 623 from the first mentioned plate of the capacitor strip F6 to the now negative terminal 622 of the coil 620, while a flow of current is effected from the now positive terminal 626 of the coil 620 to the anode 628 of the diode 630 and through the diode 630 to the conductor 542 and through the conductor 521F to the opposite plate of the capacitor strip F6.

Thus, the firing of the controlled rectifier 461F will effectively illuminate the electroluminescent capacitor strip F6 from the source of alternating current supplied by coil 620.

Further, the firing of the controlled rectifier 461F in reducing the voltage applied to the cathode 556F of the Zener diode 558F withdraws the bias applied to the base terminal 570F of the transistor 451F to render the same nonconductive and the resistor 586F effective through the diode 594F to apply a step voltage increase to the terminal 900 equivalent to six-elevenths of that effected by each of the coarse resistors 886A to 886I when rendered effective so as to in effect replace the five fine step voltage increases effected by the resistors 586A to 586E which were rendered ineffective, plus an additional or sixth step voltage increase effected by the rendering of the resistor 586F effective.

Moreover, upon the termination of the firing of the silicon controlled rectifiers 461A to 461E in response to the firing of the silicon controlled rectifier 461F at the termination of the first cycle of operation, the DC biasing voltage applied by source 552 is once again effective to apply a holding back biasing voltage to the cathodes of the controlled rectifiers 461B to 461E through the operation of the Zener diodes 558A to 558D, as heretofore described.

Thus, through such operation of the Zener diodes 558A to 558D there is applied in turn a biasing voltage to the base terminals of the transistors 451A to 451D to render the same conductive and the respective resistors 586A to 586D ineffective to apply a step voltage to the terminal 900 of the summation resistor 902 until the silicon controlled rectifiers 461A to 461D have once again been successively fired, as heretofore explained, during a second cycle of operation of the fine driven network 221 of FIG. 6 by additional driving pulses being applied through the lines A and B by the drive circuitry 218.

Moreover, the Zener diode 558E is also rendered effective by the termination of the firing of the controlled rectifier 461E to apply a biasing voltage at junction 563 and thereby through resistor 494 to the base terminal 492 of the transistor 490 to render the same conductive until such time as the controlled rectifier 461E is once again fired in the second cycle of operation.

The firing of the controlled rectifiers 461A to 461D successively apply at the terminal 900 of the summation resistor 902 unit step voltages in values equivalent to steps seven, eight, nine, and 10 respectively, and which unit step voltages are added to the step voltage of the value equivalent to the first six steps applied by the resistor 586F.

Further, the firing of the controlled rectifiers 461A to 461D in turn effectively connect the conductors 522A to 522D to ground so that the respective fine electroluminescent capacitor strips F7 to F10, shown in FIG. 8, may be effectively illuminated by alternating current applied to one plate of each of the capacitor strips F7 to F10 through conductor 623 leading from one terminal of the fine coil 620 inductively coupled to the primary winding 666. An opposite terminal 626 of the coil 620 is connected to a cathode 636 of a switching diode 638 and through diode 638 to the conductor 582 leading to ground and to an anode 628 of a second switching diode 630 having a cathode 632 connected to the conductor 542 leading to the junction 634 at the conductor 521F.

The arrangement is such that upon the controlled rectifier 461F being in a firing condition, the source of alternating current induced in winding 620 may be sequentially applied to the opposite plates of the electroluminescent capacitor strips F7, F8, F9, and F10 with the selective firing of the controlled rectifier 461A to 461D through a circuit providing during a positive half-wave of the alternating current a flow of current from terminal 622 of the winding 620 through conductor 623 to one plate of each of the electroluminescent capacitor strips F7, F8, F9, and F10 connected thereto and a return flow of current from the opposite plate applied through conductors 522A, 522B, 522C, and 522D, controlled rectifiers 461A to 461D to ground and returning through the ground connected conductor 582 to the anode 640 of the diode 638 having a cathode 636 connected to the terminal 626 of the winding 620.

During the opposite or negative half-wave there is effected a flow of current from the first mentioned plate of each of the electroluminescent strips F7, F8, F9, and F10 through conductor 623 to the terminal 622 of the coil 620 while a flow of current is effected from the now positive terminal 626 to the anode 628 of the diode 630 and through the diode 630 to the conductor 542 leading from the cathode 632 thereof to the junction 634 and through conductor 521F, resistor 635, diode 528F, controlled rectifier 461F, and resistor 466F to the grounded conductor G so as to return through the grounded terminal 245 of the source of the direct current or battery 552 and through conductor 554, resistors 550A to 550D, diodes 536A to 536D, diodes 528A to 528D, conductors 522A to 522D to the opposite plate of the electroluminescent capacitor strips F7, F8, F9, and F10 connected thereto.

Thus, the illumination of the strips F7, F8, F9, and F10 is dependent upon the firing first of the controlled rectifier 461F to render the controlled rectifiers 461A to 461D thereafter effective upon the sequential firing thereof to energize the strips F7 to F10 from the source of alternating current 620.

Further, the firing of the controlled rectifier 461F in reducing the positive bias applied to the cathode 556F of the Zener diode 558F reduces the positive bias applied through the Zener diode 558F and resistor 608 to the base 492 of the transistor 490 to provide the first of two steps required to open the shunting circuit through the transistor 490 from the resistors 514 and 516 in the driving lines A and B through diodes 506 and 508 to the grounded conductor G.

The additional step required to open the transistor 490 is the firing of the controlled rectifier 461E to complete the second cycle of operation of the driven network 221 of FIG. 6.

Thus upon a further firing pulse being applied through conductor A, the firing of the controlled rectifier 461E will be effected so that the bias at junction 563 will be decreased so as to withdraw the positive bias applied to the base terminal 492 to open the shunting circuit through the transistor 490 from the conductors A and B leading from the resistor 514 and 516 and to the grounded conductor G. The conductors A and B are thus rendered effective to apply driving pulses to the coarse driven network of FIG. 7. Moreover so long as the controlled rectifier 461F remains in a firing condition, the voltage drop across the resistor 466F applies an effective back bias to the base terminal of the transistor 451E from junction 562E and through conductor 572E and resistor 574E so as to maintain the transistor 451E conductive.

Thus, even though there have been illuminated the 10 fine electroluminescent capacitor strips F1 to F10, as shown in FIG. 8, only six silicon controlled rectifiers are needed to effect the sequential illumination thereof, because of the multiplexing feature of the network of FIG. 7. That is, the six silicon controlled rectifiers from 461A to 461F have substantially the same circuitry except the silicon controlled rectifier 461F has a somewhat different circuitry in that is has a holding feature. When the alternating excitation of lines A and B reaches the silicon controlled rectifier 461F, it will cause the signals to be again directed through silicon controlled rectifiers 461A to 461D. That is, when the pulses are directed to the sixth silicon controlled rectifier 461F, it will designate six units of measured parameters. For the seventh unit of measured parameter the silicon controlled rectifier 461F will hold the six units and at the same time will render the silicon controlled rectifiers 461A to 461D operable once again by the driving pulses at lines A and B.

More specifically, it can be understood that silicon controlled rectifier 461A may be controlled from two sources; i.e., in one sense from its original excitation and in another sense as conditioned by the firing of the silicon controlled rectifier 461F, as heretofore explained.

Therefore, to project the seventh measured parameter, silicon controlled rectifier 461F must be on and then silicon controlled rectifier 461A can be turned on. It is the same for the eighth unit of measured parameters. Silicon controlled rectifier 461F will be on so as to condition the silicon controlled rectifiers 461A and 461B for subsequent sequential firing. Therefore, when the eighth pulse comes through, silicon controlled rectifier 461F, 461A, and 461B will be turned on. When the tenth unit of measured parameters has been directed to the fine memory section FM, the fine section will be full. That is, silicon controlled rectifier 461F and 461A to 461D will be on and upon the opening of the transistor 490 by the firing of the controlled rectifier 461E, the operation of the driving pulses applied through conductors A and B will be transferred to the coarse driven system 221, as shown in FIG. 7.

This integrated information, in the fine memory section FM and in the fine summation section FS, will be retained to energize the electroluminescent capacitor strips F1 to F10 until a clearing pulse from the drive circuitry 218 of FIG. 5 is applied through the clearing line conductor C to clear the silicon controlled rectifiers 461A to 461F to permit voltage to be applied to junctions 562A to 562F by the direct current source 552. Since the junctions 562A to 562F are connected to the base terminals of the transistors 451A to 451F, they will again be saturated to open the summation circuitry. When the clearing pulse is applied at the clearing line conductor C from the drive circuitry system described in FIG. 5, it will mean that the system has sensed a decreasing input parameter.

Referring to FIGS. 6 and 7, assuming again that all the silicon controlled rectifiers 461A—D and 461F are on, the next pulse will be directed through line conductor A into silicon controlled rectifier 461E of FIG. 6. Silicon controlled rectifier 461E will not produce a direct current feedback step, but when the switch 461E is fired and after the switch 461F has been previously fired, the transistor 490 remains in an open state. That is, in order for the signal to be directed from the fine circuitry of FIG. 6 to the coarse circuitry of FIG. 7 through line conductor A or B, both the silicon controlled rectifiers 461E and 461F must be on to divert the current from both the junctions 563 and 562F by rendering the Zener diodes 558E and 558F ineffective in a reverse current breakdown sense. More specifically as shown, the base terminal 492 of the transistor 490 is connected to junctions 563 and 562F through resistors 494 and 608, respectively. If either of the junctions 563 and 562F have voltage applied, they will saturate the transistor 490 permitting no current to flow through line conductors A and B.

However, if silicon controlled rectifiers 461E and 461F are conducting, the next incoming pulses in line conductors A and B will be directed through the respective line resistors 514 and 516 into the coarse section shown in FIG. 7. The mode of operation of the coarse driven network 221 and the summation network 222 of FIG. 7 is quite similar to that of fine driven network 221 and the summation network 222 of FIG. 6, so that in the event a first pulse is applied to the coarse section of FIG. 7 through line conductor B, it will produce no effect, as explained with reference to FIG. 6. The next pulse directed through line A will, however, fire silicon controlled rectifier 761A so as to open the transistor 751A and render the resistor 886A effective through the diode 894A to increase the current applied at the terminal 900 and the voltage drop across the summation resistor 902 to a value equivalent to 11 fine step voltage producing a feedback voltage step equal to 11 units of a measured parameter.

In the event the resultant feedback voltage applied at junction 333 of FIG. 5 then be of a magnitude sufficient to overbalance the signal voltage applied by the sensor 310 at junction 313, then the output phase at lines 339—341 of the preamplifier and phase discriminator 219 will reverse causing a clearing pulse to be applied first at line C to clear all of the silicon controlled rectifiers in the fine section of FIG. 6. Thereupon should the signal voltage applied by the sensor 310 at the junction 313 once again overbalance the feedback voltage applied at junction 333, then the next pulse will be directed through line conductor B into the coarse circuitry of FIG. 7 to fire silicon controlled rectifier 761B as in the case of the silicon controlled rectifier 461B of the fine circuitry of FIG. 6. However, should the output at lines 339—341 of FIG. 5 persist in the reverse phase relation over a predetermined delay period, then additional clearing pulses would be applied at conductor D to clear all the controlled rectifiers in the coarse section of FIG. 7.

It may be further noted that in the event a large step input is applied, it will start firing the coarse section in blocks of 11 without effecting the fine section until the null is reduced to less than one coarse step or 11 fine steps, whereupon a clearing pulse will be applied at conductor C to clear the fine section and begin adding as many fine steps or units as detected.

In the clearing operation of the system, the fine section will be cleared first. If by clearing the fine section a null or phase reversal of the controlling signal is not obtained, then the coarse section will be cleared completely, since the input controlling signal would appear to have been reduced by more than 10 units. In this event, the system will again start registering in the fine single step units. The operation of the system will be as if there was no original input.

In the clearing operation of the fine and coarse circuitries of FIGS. 6 and 7, the clearing pulses received from the drive circuitry of FIG. 5 will first clear the silicon controlled rectifiers. When the silicon controlled rectifiers are cleared, a positive bias will again be applied from the source 552 through the Zener diodes 558A to 558F and conductors 572A to 572F in the fine circuitry of FIG. 6 and through the Zener diodes 858A to 858J and conductors 872A to 872J in the coarse circuitry of FIG. 7. Since the conductors mentioned above are connected to the base terminals 570A to 570F of the transistors 451A to 451F, respectively, of the fine circuitry and the base terminals 870A to 870J of the transistors 751A to 751J, respectively of the coarse circuitry, the transistors will be saturated diverting the current of the source 590 from the second diverting line conductor 598 directly to the first grounded diverting line conductor 582. The clearing of the system will thereby indicate a decreasing measured parameter or a quiescent state.

Summary Of Operation Of Solid-State Display System

Referring to FIGS. 8, 9, and 10, it can be seen that the line conductors 669 and 623 from circuitries of FIG. 6 are connected to the fine electroluminescent capacitor strips F1 to F10. The line conductors 521A to 521F and the line conductors 522A to 522D of the fine electroluminescent capacitor strips F1 to F10 are connected to the circuitry of FIG. 6 and the circuitries of FIGS. 6 and 7 are connected to the coarse electroluminescent capacitor strips C1 to C10 by line conductors 669 and 721A to 721J and to the coarse electroluminescent capacitor strips C11 to C19 by conductors 645 and 722A to 722I.

Moreover, in the coarse network of FIG. 7, in a mode of operation which is similar to that heretofore described with reference to the fine network of FIG. 6, the firing of the silicon controlled rectifiers 761A to 761J during the first cycle of operation will sequentially effect illumination of the respective coarse electroluminescent capacitor strips C1 to C10 by applying during a positive half-wave of an alternating current from the source 544, a flow of current from terminal 667 of the source 544 through the conductor 669 to one plate of the coarse strips C1 to C10 as shown by FIG. 8, while the opposite plate of each of the coarse strips C1 to C10 are selectively connected to the grounded conductor G through conductors 721A to 721J upon the firing of the controlled rectifiers 761A to 761J and returning from the grounded conductor G through the grounded conductor 582 and conductor 665 to the then negative terminal 663 of alternating current source 544.

During a negative half-wave of current from the source of alternating current 544, there is effected a flow of current from the plate of the capacitor strips C1 to C10 through the conductor 669 to the now negative terminal 667 of the source 544 and a positive flow of current from terminal 663 through grounded conductor 582 to the grounded terminal 245 of the direct current source 552 and through conductor 671, resistors 850A to 850J, diodes 836A to 836J, and conductors 721A to 721J to opposite plates of the capacitor strips C1 to C10.

In the operation of the coarse driven network 221 of FIG. 7, the mode of operation is somewhat different from that of the fine driven network of FIG. 6 in that at the junction 862A connected between the anode 860A of the Zener diode 858A and the anode 868A of the diode 866A there leads from the junction 862A a conductor 872A connected through a resistor 834 to a base 792 of an NPN type transistor 790 having a collector connected to the gating terminal 778J of the silicon controlled rectifier 761J and an emitter connected to the clearing line D.

The arrangement is such that prior to the firing of the silicon controlled rectifier 761A, a voltage bias is applied through the Zener diode 858A to the junction 862A and to the base of the transistor 790 so as to maintain the same conductive so that the gating terminal 778J of the controlled rectifier 761J is connected through the closed transistor 790 to the clearing conductor D. However, upon the firing of the controlled rectifier 761A, the bias applied at the junction 862A and to the base 792 of the transistor 790 is reduced so as to effectively render the transistor 790 nonconductive so as to disconnect the gating terminal 778J of the controlled rectifier 761J from the clearing conductor D.

It will be seen that after the silicon controlled rectifiers 761A to 761I have been fired by driving pulses applied through the conductors A and B, the subsequent application of a driving pulse through conductor B and diode 774J will effectively fire the silicon controlled rectifier 761J whereupon the capacitor 854 in response to a resulting decrease in the voltage applied at the cathode 856J of the Zener diode 858J is effective to pick up the decrease in the direct current bias applied to the cathode 756J so as to act as a clearing capacitor by applying a negative going pulse through the clearing line D and the clearing diodes 784A to 784I to the gate terminals of the controlled rectifiers 761A to 761I, as shown in FIG. 7, which thereupon terminates the firing thereof in much the same manner that the clearing capacitor 454 of FIG. 6 is effective to apply a clearing pulse to the gating terminals of the silicon controlled rectifiers 461A to 461E of the fine driven network 221 of FIG. 6, as heretofore explained.

The clearing pulse thus applied by the capacitor 854 does not effect the gating terminal 778J of the controlled rectifier 761J since the same has been effectively disconnected from the clearing line D by the previous opening of the transistor 790.

However, upon the firing of the controlled rectifier 761A being thus terminated at the end of the first cycle of operation by the firing of the controlled rectifier 761J, the transistor 790 once again is biased into a conductive state by the resulting increase in positive voltage applied at junction 862A through the Zener diode 858A, whereupon the silicon controlled rectifier 761A is conditioned for the second cycle of operation.

It will be further noted that in the first cycle of operation the sequential firing of the silicon controlled rectifiers 761A to 761I will in turn sequentially open the corresponding NPN type switching transistors 751A to 751I so as to selectively connect at the terminal 900 of the summation resistor 902 the additional resistors 886A to 886I which as heretofore explained are so calibrated that each applies an increase voltage drop across the summation resistor 902 equal to an 11 unit or step voltage increase which is in turn applied as a feedback voltage through the conductor 334 to junction 333 of FIG. 5.

Thus, the resistor 886A would apply an 11-unit increase; the resistor 886B an additional 11-unit increase or total of 22 units; the resistor 886C an additional 11 unit increase or a total of 33 units; the resistor units; the resistor 886D an additional 11-unit increase or total of 44 units; the resistor 886E an additional 11-unit increase or total of 55 units; the resistor 886F an additional increase of 11 units or total of 66 units; the resistor 886G an additional increase of 11 units or total of 77 units; the resistor 886H an additional increase of 11 units or total of 88 units; and the resistor 886I an additional increase of 11 units or total 99 units.

However, upon the controlled rectifier 761J being fired, the firing of the controlled rectifiers 761A to 761I is terminated by the clearing action of the capacitor 854 so that the resistors 886A to 886I are thereupon rendered ineffective by the opening of the controlled rectifiers 761A to 761I while the resistor 886J is rendered effective. The resistor 886J is so calibrated that upon being rendered effective by the firing of the controlled rectifier 761J, there is applied through the resistor 886J an increase in current to the terminal 900 and across the summation resistor 902 a voltage drop equal to a 110-unit increase.

Now upon each of the controlled rectifiers 761A to 761I being fired during the second cycle of operation, the step voltage applied across the summation resistor 902 by the respective resistors 886A to 886I is added to that applied by the resistor 886J to effect a 209-unit increase and upon the fine summation resistors of FIG. 6 being rendered effective, as will be explained, there is provided a maximum 209-unit increase, or indicated sensed condition.

Any number of operative units may be provided in the fine and coarse network 222 and 223, of FIGS. 6 and 7, as may be found desirable.

Furthermore, in the second cycle of operation of the coarse network of FIG. 7, it will be seen that with the controlled rectifier 761J in a firing condition, the subsequent firing of the controlled rectifier 761A will effectively illuminate the coarse electroluminescent capacitor strip C11 of FIG. 8 by alternating current from the coil 642 applied at the opposite plates of the electroluminescent capacitor strip C11 through the conductor 645 leading from the terminal 644 of the coil 642. The coil 642 is inductively coupled to the primary winding 666 and so arranged as to apply during a positive half-wave of the alternating current a flow of current through the conductor 645 to one plate of the capacitor strip C11 while a return flow of current is applied from the opposite plate of the capacitor strip C11 through a conductor 722A, the controlled rectifier 761A now in a firing condition, resistor 766A to the grounded conductor G so as to return through the grounded conductor 582 of FIG. 6 to the anode 652 of the diode 654 to the negative terminal 646 of the coil 642.

During a negative half-wave of the alternating current applied from the coil 642, a flow of current is effected through the conductor 645 from the first mentioned plate of the capacitor strip C11 to the now negative terminal 644 of the coil 642, while a flow of current is effected from the now positive terminal 646 of the coil 642 to the anode 656 of the diode 658 and through the diode 658 to the conductor 662, through the conductor 662 to the conductor 721J, and through resistor 835 therein, diode 830J, the controlled rectifier 761J in a firing condition, and resistor 766J to the grounded conductor G and returning through the grounded terminal 245 of the direct current source or battery 552 so as to return through the conductor 671, resistor 850A, diodes 836A and 828A to the conductor 722A leading to the opposite plate of the capacitor strip C11.

Thus, the firing of the controlled rectifier 761J conditions the controlled rectifier 761A to effectively illuminate the electroluminescent capacitor strip C11 from the source of alternating current 642, upon the subsequent firing of the controlled rectifier 761A. The controlled rectifiers 761B to 761I are similarly rendered sequentially effective to illuminate the electroluminescent capacitor strips C12 to C19 upon the sequential firing thereof by the drive pulses applied through the conductors A and B, as heretofore explained with reference to the controlled rectifier 761A of FIG. 7, and the controlled rectifiers 461A to 461D of FIG. 6. Further detailed explanation of the coarse network 221 and 222 of FIG. 7 is not deemed necessary.

Thus, the electroluminescent capacitor strips of FIG. 8 receive alternating current power for excitation from the alternating current source 544 shown in FIG. 6. The electroluminescent capacitor strips of FIG. 8 are so connected by line conductor 623, 645, and 669 that all the electroluminescent strips mentioned herein have power directed thereto.

Referring to FIG. 9, it can be seen that the photoconductors are connected in rows by a common conductor and that each is connected to its specific numbered electroluminescent segment to illuminate the same upon being switched on by the electroluminescent capacitor strips shown in FIG. 8.

As best shown in FIG. 10, FIG. 9 has overleafed FIG. 8 so that points A, B, and C of FIG. 9 overlay points A1, B1, and C1 of FIG. 8. By this method, photoconductor PC1 physically faces the fine electroluminescent strip F1 and coarse electroluminescent strip C1. In the same manner, photoconductor PC2 physically faces the fine electroluminescent strip F2 and coarse electroluminescent strip C1. In this respect the photoconductors and the electroluminescent strips are interconnected to form the matrix 220 for optical interrelation. FIG. 10 also shows the electrical connection between electroluminescent segments 226 and the photoconductor switches 224.

The embodiment of FIG. 11 shows an overall interconnection of the silicon controlled rectifiers, photoconductors, and electroluminescent devices. Also shown are silicon controlled rectifiers of FIGS. 6 and 7 connected to the fine and coarse electroluminescent strips of FIG. 8 which are connected to the photoconductors of FIG. 9 and which in turn are connected to the electroluminescent display segments 226. In detail, there is shown silicon controlled rectifier 461A connected to the fine electroluminescent strip F1 through the line conductor 521A and to the electroluminescent strip F7 through the line conductor 522A. In addition, there is shown silicon controlled rectifier 461B connecting the fine electroluminescent strip F2 through the line conductor 521B and the electroluminescent strip F8 through the line conductor 522B. In the same manner, silicon controlled rectifiers 461C to 461F are connected to their fine electroluminescent strips.

As hereinbefore mentioned, the coarse electroluminescent control section 236 of FIGS. 2 and 11 provides for the 19 electroluminescent strips C1 to C19 on the X-axis and the fine electroluminescent control section 238 provides for the 10 electroluminescent strips F1 to F10 on the X-axis.

In the coarse section 236, the silicon controlled rectifier 761A is connected to the electroluminescent strip C1 on the X-axis through the line conductor 721A and to the electroluminescent strip C11 on the X-axis (not shown) by the line conductor 722A. Further, as shown, silicon controlled rectifier 761B is connected to the second electroluminescent strip C2 on the X-axis by the line conductor 721B and to the twelfth electroluminescent strip C12 on the X-axis (not shown) by a line conductor 722B. In this manner, the remaining coarse silicon controlled rectifiers 761C to 761J are connected to their respective electroluminescent strips on the X-axis as hereinbefore described.

Superimposed on the fine control electroluminescent strips F1 to F10 and the coarse control electroluminescent strips C1 to C19 are the 209 photoconductors PC1 to PC209. As noted in FIG. 11 the last row of photoconductors on the X-axis, such as PC11, PC22, PC33, and up to PC209, provide for the sectional control of the system symbolically shown as S1 to S19. That is, as hereinbefore described, photoconductor PC11 connects for standby the next row of photoconductors PC12 to PC22 which extend in parallel relation therewith and which are superimposed on the coarse electroluminescent strip C2. More specifically, PC11 directs current to photoconductors PC12 to PC22, but no current can be directed through these photoconductors until they are illuminated by either the fine electroluminescent strips F1 to F10 or the coarse electroluminescent strip C2.

In the overall operation of the solid state display system, referring generally to all the FIGS. of the drawing and assuming, for example, that there is to be sensed by the thermocouple 310, a 36° rise temperature signal from a datum point, the thermocouple 310 converts the sensed temperature into a signal voltage. As shown symbolically in FIG. 2, both the fine control section and the coarse control section will be effected Due to the sensed 36° temperature and resulting signal voltage, there will be a group of pulses alternately directed from the control circuit 218 shown in FIG. 5 through the line conductors A and B.

It should be noted that there are four modes of operation in this system corresponding (1) to a large increasing signal, (2) a small increasing signal, (3) a small decreasing signal, and (4) a large decreasing signal. Thus, upon (1) a large increasing signal voltage, the drive circuitry 218 acts to alternately apply signal pulses to the lines A and B for both the fine and the coarse control. This action causes the coarse control of FIG. 7 to provide a step integration of a large signal until it is reduced by means of the feedback loop 334 to a sufficiently low value at which time the fine control section of FIG. 6 takes over. Again it should be noted that in the case of (2) a small increasing signal, the coarse control section is shorted out by the action of the transistor 490 so that only the fine control of FIG. 6 is activated.

The alternate excitation of lines A and B continue to integrate the error until it is reduced to null. When this point is reached, the integration stops. In the mode of operation (3) when the signal is decreasing by a small quantity, information in the fine circuitry of the FIG. 6 is removed by a clearing signal being applied only through the line C, while in the mode of operation (4) when the signal is decreasing by a large quantity, all information is removed from both the fine and coarse circuitry by clearing signals being applied through both lines C and D permitting the recycling of the system by the operation of the first and second modes until the electroluminescent display segments 226 are adjusted to a new signal level.

In detail, the first effected signal will be directed by the thermocouple 310 to junction 313 of the comparator 216. At this instant within the comparator 216, there is one unit of voltage. That means across the transistor 316 between junctions 313 and 333, there is one unit of voltage. The net difference or the net error between these junctions appearing across the transistor will be converted to alternate current voltage and fed into the preamplifier and phase discriminator 219. This amplifier and discriminator 219 then amplifies the voltage, for example, 500 times. The amplification is necessary because the thermocouple 310 provides a very small voltage and a voltage sufficiently great is necessary to operate the system as heretofore more fully described.

In addition, the amplifier and discriminator 219 is necessary because the signals between junctions 313 and 333 will be either negative or positive. If the error is positive, that is, if the thermocouple voltage at junction 313 is greater than the voltage at junction 333, the phase discriminator 219 will direct a signal into the drive circuitry 218 shown in FIG. 5. The signal will then be fed through the line conductor A by the circuit of FIG. 5 to the gate terminal 478A to switch on the first silicon controlled rectifier 461A and to effect the operation thereof.

The first effective pulse turning on the silicon controlled rectifier 461A will permit alternating current from the source 544 to be directed to apply across the fine electroluminescent capacitor strip F1 by the line conductor 623 and by the conductor 521A controlled by the silicon controlled rectifier 461A as heretofore explained. Since only the fine electroluminescent strip F1 is illuminated by this first pulse, it will energize photoconductor PC1 to make it conductive. Again, since photoconductor PC1 is conductive, it will direct current from the source 243 to the first electroluminescent display segment EL1 to illuminate it, as shown by FIG. 3.

The illumination of the display segments 226 will continue sequentially EL1 to EL10 up to the eleventh electroluminescent display segment EL11. The eleventh display segment EL11 is controlled by the photoconductor PC11 which is rendered conductive only upon illumination of the electroluminescent capacitor strip C1 being energized upon closure of the switch 761A. Further, the photoconductor PC11 is connected to the second group of photoconductors PC12 to PC22 by line conductor 252 as shown in FIG. 3, so as to provide voltage up to said photoconductors PC12 to PC22 upon an illumination of the photoconductor PC11.

Thus, upon the thermocouple 310 sensing 36 units of a measured parameter, an error will appear at junction 313 in that it is still positive over junction 333. The error is again chopped and converted to alternate current by the transistor 316. Then it is directed through the preamplifier and phase discriminator 219 through the control circuitries of FIG. 5 past the fine control circuitry of FIG. 6 to turn on the coarse silicon controlled rectifier 761A. That means at this moment 11 more electroluminescent segments will be displayed or EL1 through EL21.

However, since the error is still equivalent to 15 segments and it is still positive, the signal will be sent through the system to turn on the second silicon controlled rectifier 761B. At this moment, there will be 32 units displayed in the electroluminescent display segments 226 or EL1 through EL32.

Again since the error is equivalent to 36 units, there will still be a positive error between junction 313 and 333. Momentarily, the third silicon controlled rectifier 761C will be fired by the next pulse. The error between junction 313 and 333 will then be reversed since junction 333 will be positive in relation to junction 313. At this instance, since the error is negative, silicon controlled rectifiers 461A to 461F of the fine circuitry of FIG. 6 will be cleared. The error will immediately reverse so that junction 313 will be positive in relation to junction 333. This error will cause pulses to be directed through line conductor A and B again to the fine control circuitry of FIG. 6 until three additional units are picked up in the closure of the silicon controlled rectifiers 461A to 461C illuminating strips F1 to F3 in addition to the coarse strips C1 to C3 making a total of 36 electroluminescent display segments or EL1 through EL36.

In further explanation of this operation, the third silicon controlled rectifier 761C plus the controlled rectifiers 461A to 461F would designate that 43 units have been sensed and there would be a negative error between junction 313 and 333. When silicon controlled rectifier 761C is on, the fine circuitry of FIG. 6 will be still on. Since the moment the voltage is reversed the system senses a negative error, it will turn off the fine circuitry. The error will be reversed again, and then the system will add sequentially three units by the fine circuitry to produce a total of 36 units of measured parameter.

The electroluminescent photoconductor matrix 234, shown in FIGS. 8 to 11, is tired into the circuitry of FIGS. 6 and 7 so that it is instantaneously energized by the continuous alteration of the electronic components of the systems.

Moreover, upon the silicon controlled rectifiers 461A to 461F being cleared, it may be noted that while the illumination of the electroluminescent capacitor strips F1 to F10 controlled thereby will be discontinued, the coarse electroluminescent capacitor strips C1 to C3 controlled by the silicon controlled rectifiers 761A to 761C will be illuminated so as to render the photoconductors PC1 to PC33 conductive to effect the energization and illumination of the electroluminescent segments EL1 to EL33 of the display 226, while the illumination of the remaining display segments EL34 to EL36 will be effected by the controlled illumination of strips F1 to F3 in the same manner that the other electroluminescent display segments 226 may be illuminated by the operation of the controlled rectifiers within the coarse control circuitry to make voltage available to successive rows of electroluminescent capacitor strips C4 to C19. Notice that voltage is always present but unless the coarse electroluminescent strips are illuminated by the sequential operation of the silicon controlled rectifier switches, 761A to 761J, the voltage cannot pass between the immediately preceding and succeeding rows of electroluminescent strips extending along the X-axis to effect the illumination of the respective blocks of 11 electroluminescent segments controlled thereby, and lesser segments must be illuminated by the fine strips F1 to F10.

In this respect, the silicon controlled rectifiers 461A to 461F have an additional function of controlling the illumination of the fine strips F1 to F10 extending along the Y-axis in relation to the photoconductors PC for directing current into the separate electroluminescent display segments 226. Therefore, if there is a measured parameter of 36 units and 33 electroluminescent segments have been turned on by the operation of the silicon controlled rectifiers 761A, 761B, and 761C to illuminate the coarse strips C1 to C3; the signal at junction 313 will still be at a higher potential than at junction 333. The fine silicon controlled rectifiers 461A to 461B will receive the next pulses applied through lines A and B from the drive circuitry of FIG. 5 so as to add two more segments EL34 to EL35 to the system. That is the next pulse going through line conductor A will fire silicon controlled rectifier 461A producing 34 units, thereafter the next succeeding pulse going through line conductor B will fire silicon controlled rectifier 462B for the 35th unit, and silicon controlled rectifier 461C will thereafter be fired by the next pulse applied through line conductor A to produce the total of 36 units. At the same time that the silicon controlled rectifiers are operating, the electroluminescent matrix 220 will be sequentially lighting the electroluminescent display segments 226, through the photoconductors as heretofore described.

Basically, this system provides a multiplexing action wherein the same circuits are reused by having a holding feature and thereby the number of components are reduced. The multiplexing feature is also produced by the operation of the controlled rectifier 761J in the coarse circuit of FIG. 7 as well as by the operation of the controlled rectifier 461F in the fine circuit of FIG. 6. That is, when silicon controlled rectifier 461J is on, there would be at least 120 units sensed. The pulse that energizes silicon controlled rectifier 761J also clears silicon controlled rectifier 761A to 761I without clearing the silicon controlled rectifiers 461A to 461F of the fine control circuitry or discontinuing the illumination of the fine electroluminescent capacitor strips F1 to F10 operated thereby and without discontinuing the illumination of the electroluminescent capacitor strips C1 to C9 initially energized by the controlled rectifiers 761A to 761I, while the electroluminescent capacitor strip C10 also is effectively illuminated so long as the controlled rectifier 761J remains closed.

Thus, when the next pulse is directed through the line conductor A, it will fire silicon controlled rectifier 761A to cause the display 226 to indicate a 131st sensed unit of measure and the following pulse going through line conductor B will fire silicon controlled rectifier 761B to cause the display 226 to indicate a 142nd forty-second sensed unit of measure and so on back to the last silicon controlled rectifier 761I to produce a total of 209 units; i.e., 209 units effected by illumination of the coarse capacitor strips C1 to C19, or 10 units effected by illumination of the fine capacitor strips F1 to F10, plus 198 units effected by the coarse capacitor strips C1 to C18, plus, an additional unit upon the closing of the controlled rectifier 761I or the subsequent illumination of the coarse capacitor strip C19.

The dimming circuit shown in FIG. 4 utilizes the capacitor characteristics of the electroluminescent display segments 226 so that a direct current applied across the opposite plates of the display segments 226 effects no illumination. At the same time, if a portion of the alternating current voltage of the illuminating current is blocked, the brightness of the electroluminescent display segments 226 will be varied thereby. In the bridge circuit of FIG. 4, there is a direct current supplied in series with the alternating current voltage and with the electroluminescent display segments 226 so that as the direct current is increased in the bridge rectifier 256, the alternating current across the electroluminescent display segments 226 will be reduced.

In summary therefore, the solid-state display circuitry described herein provides for the reduction in activating the circuitry by means of a four dimensional control, the use of an electronic servo for greater accuracy, and the use of means to simultaneously switch off all the photoconductors for a faster response within the system. In addition, this system provides for a unique combination of electronic and optoelectronic techniques in a matrix control with a multifunction operation of the coarse and fine control circuitries and a dual function of a transfer circuit. Further, this system provides for a high accuracy produced by a simple summation circuit, a unique circuit arrangement for excitation control and level changes. In addition, this invention provides for a unique electronic isolation between control and display sections achieved by means of the electroluminescent and photoconductor components and a unique circuit for dimming the electroluminescent display segments.

While several embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

We claim:

1. A control network comprising a plurality of control devices sequentially operated by electrical signal pulses of one sense for effecting control functions, means responsive to an initial sequential operation of a last of said control devices for effecting an electrical pulse of another sense to terminate the operation of other of said control devices, circuit holding means rendered effective by the initial operation of the last of said control devices for maintaining the control functions effected by the other of said control devices, the other of the control devices being thereupon conditioned for sequential reoperation by the signals of said one sense to effect additional control functions.

2. The combination defined by claim 1 in which the means responsive to an initial sequential operation of the last of said control devices includes a current control means and a capacitor means, the current control means being responsive to the initial sequential operation of the last of said control devices for causing the capacitor means to effect the electrical pulse of said other sense to terminate the operation of the other of said control devices.

3. The combination defined by claim 1 including a capacitor-resistance time delay means rendered effective by the initial sequential operation of the last of said control devices to prevent the electrical pulse of said other sense from terminating the operation of the last of said control devices.

4. The combination defined by claim 1 in which the means responsive to an initial sequential operation of the last of said control devices includes a current control means and a capacitor means, the current control means being responsive to the initial sequential operation of the last of said control devices for causing the capacitor means to effect the electrical pulse of said other sense to terminate the operation of the other of said control devices, and a capacitor-resistance time delay means rendered effective by the initial sequential operation of the last of said control devices to prevent the electrical pulse of said other sense from terminating the operation of the last of said control devices.

5. The combination defined by claim 1 including switching means conditioned by initial operation of the first of said control devices to prevent the electrical pulse of said other sense from terminating the operation of the last of said control devices.

6. The combination defined by claim 1 in which the means responsive to an initial sequential operation of the last of said control devices includes a current control means and a capacitor means, the current control means being responsive to the initial sequential operation of the last of said control devices for causing the capacitor means to effect the electrical pulse of said other sense to terminate the operation of the other of said control devices, and a switching means conditioned by initial operation of the first of said control devices to prevent the electrical pulse of said other sense from terminating the operation of the last of said control devices.

7. The control network defined by claim 1 including a second plurality of control devices, switching means effective upon completion of the sequential reoperation of the other of the control devices of the first mentioned control devices for rendering the second plurality of control devices effective for operation, the second plurality of control devices being thereupon sequentially operable by electrical signal pulses of said one sense for effecting other control functions, third means responsive to an initial sequential operation of a last of said second control devices for effecting an electrical pulse of said other sense to terminate the operation of other of said second control devices, fourth means rendered effective by the initial operation of the last of said second control devices for continuing the other control functions effected by the other of said second control devices, the other of the second control devices being thereupon conditioned for sequential reoperation by the electrical pulses of said one sense to effect further additional control functions.

8. The combination defined by claim 7 in which the means responsive to an initial sequential operation of the last of said first mentioned control devices includes a Zener diode and a capacitor means, the Zener diode being responsive to the initial sequential operation of the last of said control devices for causing the capacitor means to effect an electrical pulse of said other sense to terminate the operation of the other of said first control devices, and the third means includes another Zener diode and another capacitor means, the other Zener diode being responsive to the initial sequential operation of the last of said second control devices for causing the other capacitor means to effect an electrical pulse of said other sense to terminate the operation of the other of said second control devices.

9. The combination defined by claim 7 in which the means responsive to an initial sequential operation of the last of said first mentioned control devices includes a Zener diode and a capacitor means, the Zener diode being responsive to the initial sequential operation of the last of said control devices for causing the capacitor means to effect an electrical pulse of said other sense to terminate the operation of the other of said first control devices, and the third means includes another Zener diode and another capacitor means, the other Zener diode being responsive to the initial sequential operation of the last of said second control devices for causing the other capacitor means to effect an electrical pulse of said other sense to terminate the operation of the other of said second control devices, a capacitor-resistance time delay means rendered effective by the initial sequential operation of the last of said first control devices to prevent the first mentioned electrical pulse of said other sense from terminating the operation of the last of said first control devices, and a switching means conditioned by initial operation of the first of said second control devices to prevent the electrical pulse of said other sense effected by said third means from terminating the operation of the last of said second control devices.

10. The combination defined by claim 7 in which the switching means includes means first conditioned by operation of the last of said first control devices and subsequentially rendered effective by sequential reoperation of the penultimate of the plurality of first control devices for rendering the second plurality of control devices effective for operation.

11. The combination defined by claim 7 in which the switching means includes means first conditioned by operation of the last of said first control devices and subsequently rendered effective by sequential reoperation of the penultimate of the plurality of first control devices for rendering the second plurality of control devices effective for operation; the means responsive to an initial sequential operation of the last of said first mentioned control devices includes a Zener diode and a capacitor means, the Zener diode being responsive to the initial sequential operation of the last of said control devices for causing the capacitor means to effect an electrical pulse of said other sense to terminate the operation of the other of said first control devices, and the third means includes another Zener diode and another capacitor means, the other Zener diode being responsive to the initial sequential operation of the last of said second control devices for causing the other capacitor means to effect an electrical pulse of said other sense to terminate the operation of the other of said second control devices; a capacitor-resistance time delay means rendered effective by the initial sequential operation of the last of said first control devices to prevent the first mentioned electrical pulse of said other sense from terminating the operation of the last of said first control devices, and a switching means conditioned by initial operation of the first of said second control devices to prevent the electrical pulse of said other sense effected by said third means from terminating the operation of the last of said second control devices.

12. The combination defined by claim 7 including means responsive to electrical signal pulses of another sense to selectively terminate the operation of the first and second mentioned plurality of control devices.

13. The combination defined by claim 7 including means responsive to electrical signal pulses of another sense to selectively terminate the operation of the first and second mentioned plurality of control devices, clearing means to apply the electrical signal pulses of said other sense to said means to selectively terminate the operation of said first and second mentioned plurality of control devices, said clearing means including time delay means to apply the signal pulses of said other sense to said second plurality of control devices so as to terminate the operation of said second plurality of control devices after the operation of the first mentioned plurality of control devices has been terminated by the signal pulses of said other sense.

14. The combination defined by claim 7 including means for receiving and integrating control signals from the first and second plurality of control devices, a fine summation network and a coarse summation network, the fine summation network being operatively controlled by the first plurality of control devices, the coarse summation network being operatively controlled by the second plurality of control devices, and means operatively connecting the fine and coarse summation networks so as to effect a feedback signal for operating the control network.

15. The combination defined by claim 7 including means for receiving and integrating control signals from said first and second plurality of control devices, a fine summation network and a coarse summation network, the fine summation network including means operated by the first plurality of control devices for effecting a feedback signal for operating the control network, and the coarse summation network including means operated by the second plurality of control devices for effecting the feedback signal for operating the control network.

16. The combination defined by claim 7 including means responsive to a second sequential operation of the penultimate of said first control devices for rendering the second plurality of control devices effective for sequential operation by the signals of said one sense.

17. The combination defined by claim 7 including means for receiving and integrating control signals from said first and second plurality of control devices, a fine summation network and a coarse summation network, the fine summation network including means operated by the first plurality of control devices for effecting a feedback signal for operating the control network, and the coarse summation network including means operated by the second plurality of control devices for effecting the feedback signal for operating the control network; and means responsive to a second sequential operation of the penultimate of said first control devices for rendering the second plurality of control devices effective for sequential operation by the signals of said one sense.

18. The combination defined by claim 17 including means responsive to the signals of said other sense to selectively terminate the operation of the first and second plurality of control devices.

19. In a control network of a type including a plurality of control rectifiers sequentially operated by electrical signal pulses of one sense for effecting control functions and responsive to electrical pulses of another sense to terminate the operation thereof; the improvement comprising a current control means and a capacitor controlled thereby, the current control means and the capacitor being operatively connected in the control network of the control rectifiers, the current control means being responsive to operation of the last of the sequentially operated control rectifiers for causing the capacitor to effect an electrical pulse of said other sense to terminate the operation of other of said sequentially operated control rectifiers.

20. The improvement defined by claim 19 including a capacitor-resistance time delay means rendered effective by the initial sequential operation of the last of said control rectifiers to prevent the electrical pulse of said other sense from terminating the last of said control rectifiers.

21. The improvement defined by claim 19 including switching means conditioned by initial operation of the first of said control rectifiers to prevent the electrical pulse of said other sense from terminating the operation of the last of said control rectifiers.

22. The improvement defined by claim 19 in which the current control means includes a Zener diode having a threshold potential below which it is nonconductive and above which it is conductive, the Zener diode being operatively connected in the control network of the control rectifiers and to the capacitor, the Zener diode being rendered nonconductive in response to operation of the last of the sequentially operated control rectifiers for causing the capacitor to effect the electrical pulse of said other sense to terminate the operation of other of said sequentially operated control rectifiers.

23. A control network comprising a first plurality of control devices sequentially operated by electrical signal pulses of one sense for effecting control functions, a second plurality of control devices, and switching means effective upon completion of a sequential operation of the first control devices for rendering the second plurality of control devices effective for sequential operation by electrical signal pulses of said one sense for effecting other control functions.

24. The combination defined by claim 23 including means to apply electrical signal pulses of another sense to terminate operation of said first and second plurality of control devices, time delay means to apply the electrical signal pulses of said other sense to said second plurality of control devices so as to terminate the operation of said second plurality of control devices after the operation of the first plurality of control devices has been terminated by the signal pulses of said other sense.

25. The combination defined by claim 23 including means for receiving and integrating control signals from the first and second plurality of control devices, a fine summation network and a coarse summation network, the fine summation network being operatively controlled by the first plurality of control devices, the coarse summation network being operatively controlled by the second plurality of control devices, and means operatively connecting the fine and coarse summation networks so as to effect a feedback signal for operating the control network.

26. The combination defined by claim 23 including means to apply electrical signal pulses of another sense to terminate operation of said first and second plurality of control devices, time delay means to apply the electrical signal pulses of said other sense to said second plurality of control devices so as to terminate the operation of said second plurality of control devices after the operation of the first plurality of control devices has been terminated by the signal pulses of said other sense; means for receiving and integrating control signals from the first and second plurality of control devices, a fine summation network and a coarse summation network, the fine summation network being operatively controlled by the first plurality of control devices, the coarse summation network being operatively controlled by the second plurality of control devices, and means operatively connecting the fine and coarse summation networks so as to effect a feedback signal for operating the control network.

27. A control network comprising a first plurality of control devices sequentially operated by electrical signal pulses of one sense for effecting control functions, a second plurality of control devices, switching means to render the second plurality of control devices inoperative by said electrical signal pulses of said one sense, and control means operatively connected to said switching means and responsive to the operation of said first plurality of control devices by said electrical signal pulses to cause said switching means to render the second plurality of control devices effective for sequential operation by electrical signal pulses of said one sense for effecting other control functions.

28. The combination defined by claim 27 in which said control means includes first means responsive to an initial sequence of operation of said first plurality of control devices by said electrical signal pulses to condition said switching means to subsequently render the second plurality of control devices effective for a sequential operation, and second means responsive to a succeeding sequence of operation of said first plurality of control devices by said electrical signal pulses of said one sense to thereupon render the second plurality of control devices effective for sequential operation by electrical signal pulses of said one sense for effecting other control functions.

29. The combination defined by claim 27 in which said control means includes first means responsive to an initial sequence of operation of said first plurality of control devices by said electrical signal pulses to condition said switching means to subsequently render the second plurality of control devices effective for a sequential operation, said first means including means responsive to operation of the last of said plurality of control devices in said initial sequence of operation to apply an electrical clearing pulse of another sense to other of said plurality of first control devices to terminate operation thereof, and second means responsive to a succeeding sequence of operation of the other of said first plurality of control devices by said electrical signal pulses of said one sense to thereupon render the second plurality of control devices effective for sequential operation by electrical signal pulses of said one sense for effecting other control functions.

30. The combination defined by claim 29 including other means responsive to the operation of the last of said second plurality of control devices in said sequence of operation thereof to apply an electrical clearing pulse of another sense to other of said second plurality of control devices to terminate operation thereof preparatory to a succeeding sequence of operation of said other second control devices by said electrical pulses of said one sense.

31. The combination defined by claim 30 including other switch means conditioned by initial operation of the first of said second plurality of control devices to prevent the electrical pulse of said other sense from terminating the operation of the last of said second plurality of control devices.